United States Patent [19]
Carlini

[11] Patent Number: 6,141,461
[45] Date of Patent: Oct. 31, 2000

[54] HIGH-PASS FILTERING PROCESS FOR FOCUSING IMAGE

[75] Inventor: Davide Carlini, Genova, Italy

[73] Assignee: Esaote S.p.A., Casale Monferrato, Italy

[21] Appl. No.: 09/027,218

[22] Filed: Feb. 20, 1998

[30] Foreign Application Priority Data

Feb. 21, 1997 [IT] Italy ................................ SV97A0011

[51] Int. Cl.$^7$ .................................................... G06T 5/00
[52] U.S. Cl. ............................................ 382/261; 382/263
[58] Field of Search .................................. 382/263, 260, 382/261, 254, 266

[56] References Cited

U.S. PATENT DOCUMENTS

| | | |
|---|---|---|
| 4,731,865 | 3/1988 | Sievenpiper . |
| 5,070,465 | 12/1991 | Kato et al. . |
| 5,390,264 | 2/1995 | Ishihara et al. ..................... 382/260 |

OTHER PUBLICATIONS

A Fast Filtering Algorithm for Image Enhancement; 557–564; 1994.

Primary Examiner—Scott Rogers
Attorney, Agent, or Firm—Burns, Doane, Swecker & Mathis, L.L.P.

[57] ABSTRACT

High-pass filtering process for focusing images, particularly digital images, or similar, which are composed of a plurality of single dot areas, named pixels (Pi,j), having different individually variable luminous intensities I (Pi,j). The filtering process provides, for each pixel (Pi,j) a correction C (Pi,j) of the intensity value of said pixel (Pi,j), which is calculated statistically, on the basis of combinations of high-pass filterings performed in at least one, preferably in at least four different directions (0°, 45°, 90°, 135°). According to the invention, the high-pass filter determines the correction (C,(Pr,r)) of each pixel (Pr,r; Px,x) on the basis of a mean of the intensities of at least pairs of pixels being next to, that is at predetermined distances from and on opposite sides of the filtered pixel (Pr,r; Px,x), with reference to each of the predefined directions (0°, 45°, 90°,135°), creating a corresponding new filtered image, composed of the corrected pixels.

33 Claims, 12 Drawing Sheets

HIGH-PASS FILTERING PROCESS FOR FOCUSING IMAGE

This application claims priority under 35 U.S.C. §§119 and/or 365 to Appln. SV97A000011 filed in Italy on Feb. 21, 1997; the entire content of which is hereby incorporated by reference.

BACKGROUND OF THE INVENTION

1. Field of the Invention

The invention relates to a high-pass filtering process for focusing images, particularly digital or similar images, which are composed of a plurality of single dot areas, named pixels having different individually variable luminous intensities, so as to generate all together an image. More particularly, the filtering process provides for each pixel of the image a correction of the intensity value of said pixel, which is calculated statistically, on the basis of combinations of high-pass filterings performed in at least one, and preferably in at least four, different directions with respect to the matrix of the pixels forming the image.

2. Description of Related Art

In prior art methods, each pixel under examination is subjected to high-pass filtering in multiple directions, using high-pass monodirectional filters. Then, the results of each monodirectional high-pass filtering are combined, after being weighted, to obtain statistical corrections of the filtered pixel.

These prior art high-pass filtering methods ensure, on the one hand, that the image is well focused, that is provided with sharp outlines, but may cause, at the same time, the outlines having intensity variations to a certain substantial extent, to shift, and thus involve a certain level of deformation in the reproduced image as compared to the real shape of the corresponding object. This is a very serious drawback, particularly in image in acquisition devices, such as those for image acquisition by echography or by nuclear magnetic resonance. In this case, a high level of correspondence between the real shape and the reproduced image, as well as a high level of sharpness and clarity are extremely important.

OBJECTS AND SUMMARY

Therefore, the invention is based on the problem of providing a high-pass filtering process for images made, particularly, of matrices of dot areas, being independent of each other, which allows to obtain sharp and focused images, with the highest fidelity with respect to the object under examination, and with a small computing time requirement.

The invention solves the above problem with a process of the type described hereinbefore, in which the high-pass filter generates the correction of each pixel of an image made of a set of pixels, that is of a pixel matrix, said correction being based on the mean of the intensities of at least pairs of pixels, neighboring, i.e. being at predetermined distances from and on opposite sides of the pixel under examination, creating a corresponding new filtered image, composed of the corrected pixels.

According to an improvement, the correction is calculated as an appropriately weighted mean between correction values obtained form the means of the intensities of at least one pair, or at l east several pairs of pixels, of the pixel matrix under examination, on opposite sides of the pixel under examination, with reference to at least two different directions of the pixel matrix, preferably four directions of the pixel matrix, while said procedure is repeated for each pixel of the pixel matrix under examination, that is to be filtered.

Advantageously, the correction of each pixel is calculated on the weighted combination of the so-called directional corrections, resulting from the means of at least two pairs of pixels on the opposite sides of the pixel under examination, the pixel pairs being oriented in a horizontal direction, in a vertical direction, and in two intermediate diagonal directions respectively, that is corresponding to the angular positions at 0°, 45°, 90°, 135°.

According to a first embodiment, while calculating the means of the intensities of at least pairs of pixels on the opposite sides of the pixel under examination, the pixel intensity is weighted according to their distance from the pixel under examination, each intensity value being multiplied by a factor decreasing at the distance increases.

Particularly, the process according to the invention has the following steps:

a) Calculating, for each of at least one, preferably of the four different directions, which may be defined with reference to the pixel matrix, the mean values of intensity, appropriately weighted, if necessary, with respect to distance, of two or more pixels of the pixel matrix, that is of the image to be filtered, said pixels being on opposite sides of the pixel under examination, and aligned along a predetermined direction;

b) Calculating, for each of at least one, preferably of the four directions, which may be defined with reference to the pixel matrix, a so-called directional intensity threshold, which equals the grand mean of the intensities of the pixels on the opposite sides of the pixel under examination, hereafter indicated as M (dir, 1) and M (dir, 2);

c) Calculating, for each of at least one, preferably of the four directions, which may be defined with reference to the pixel matrix, a so-called directional, i.e. direction-dependent correction factor, which is the absolute value of the difference between the means of the intensities of the neighboring pixels on the two opposite sides of the pixel under examination, hereafter indicated as M (dir, 1) and M (dir, 2), and aligned in the predetermined direction, the said correction factor being appropriately weighted by multiplying it by a weighting factor, and being assigned a positive or negative sign, according to whether the intensity of the pixel under examination is higher or lower than the threshold value for the corresponding direction.

d) Calculating the intensity correction of the pixel being filtered, by adding up the individual appropriately weighted directional corrections, as in the previous step c) and by normalizing said sum by dividing it by the sum of the weighting multiplying factors of the directional correction values;

e) Adding the correction value obtained therefrom to the intensity value of the pixel under examination.

f) Repeating the previous steps a) to e) for each of at least one predetermined part or of all the pixels of the pixel matrix in the pre-filtering situation.

The directional correction values, whose normalized sum gives the intensity correction of the pixel under examination may be weighted in different ways, and particularly satisfactory results are obtained by weighting each directional correction value, by multiplying it by its own value.

The high-pass filtering process according to the above description allows to remove the outline blurring effect in a digital image, through relatively fast calculations and thus a shorter computing time, especially in computers with a poorer and cheaper configuration. All this without causing any shift or deformation of lines as compared to the real situation, and thus ensuring a very high fidelity between the real situation and the displayed image, particularly when the image is the resultant of acquisition methods by echography or nuclear magnetic resonance.

However, in this basic embodiment, the high-pass filter performs nearly on-off corrections, therefore the corrected image may have lines or outlines between bright and dark areas with a saw-profile.

In order to remove this drawback, according to an invention improvement, for each direction of at least one, preferably of the four directions, which may be defined with reference to the dot matrix, not only one directional threshold is calculated, but any greater number of thresholds, related to the corresponding direction, may be defined, with the help of the means of the intensities of the neighboring pixels on the opposite sides of the pixel under examination. In this way, the intensity of the pixel under examination may fall in the range of n+1 intervals, defined by n directional thresholds.

The sign and the directional correction value, as well as the weight which may be assigned to the latter, may be thus calculated depending on the interval in which the intensity value of the pixel falls.

Particularly, in this case, the method according to the invention provides that an attenuation and/or enhancement factor be assigned to the directional correction of intensity which is a function of the interval between the thresholds in which the intensity of the pixel under examination falls.

The function on which the directional correction attenuating/enhancing factor depends is such, that said factor increases at the absolute value of the difference between the intensity of the pixel under examination and the central threshold increases.

Particularly, an attenuation factor of 1 is used when the intensity of the pixel under examination falls within the intervals at the maximum distance from the central threshold. Particularly, given an odd number n of thresholds and a number n+1 of intervals, the attenuation factor will increase of 2/(n+1) for each interval progressively departing from the central threshold.

On the contrary, the signs and the absolute values of the individual directional corrections are obtained in the same way as in the case of a single threshold, assigning a negative or a positive sign, according to whether the intensity of the pixel under examination is lower or higher than the central threshold, and assigning, as an absolute value of the correction, the weighted difference between the mean values of intensity of the pixels on the opposite sides of the pixel under examination in the corresponding direction.

Therefore, the correction is obtained by summing up the directional corrections, multiplied by their respective attenuation factor and by the corresponding weight of the single directional corrections, and through the division of such a sum by the sum of the weights of the directional corrections.

Thanks to this improvement, the intensity corrections for the individual pixels under examination are attenuated or enhanced according to the absolute value of the difference between the intensity value of the filtered image, and the central directional threshold, which is defined as a grand mean of all means named M (dir, 1), and M (dir, 2) of the intensity values of the neighboring pixels on the opposite sides of the pixel under examination and in the corresponding direction. As a result of these attenuations, or enhancements of the correction of the pixel intensities, a removal of the image blurring is still obtained, but the saw profile of lines is also removed.

The high-pass filter according to the invention is advantageously applied to an image made of a pixel matrix, which has been previously submitted to low-pass filtering in order to remove noise, that is intensity fluctuations of pixels caused by noise while the image is being detected.

Even in the case of two or more thresholds, the high-pass filter is simple and requires small processing times and a computing powers with respect to prior art filtering methods for sharpness enhancement. Moreover, this improvement also does not cause deformations of the image with respect to the real situation, therefore allowing for a high reproduction fidelity.

The invention also relates to further improvements which form the subject of the dependent claims.

BRIEF DESCRIPTION OF THE DRAWINGS

The characteristics of the invention and the advantages deriving therefrom will appear more clearly from the following description of a non limiting embodiment illustrated in the accompanying figures, in which.

DETAILED DESCRIPTION OF THE PREFERRED EMBODIMENTS

Figure 1:
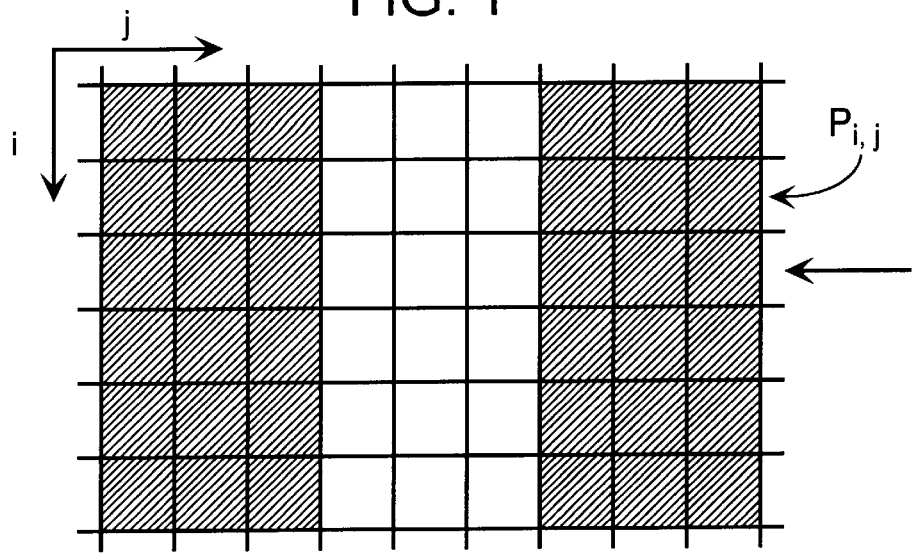
FIG. 1 shows an area of a digital image, made of two dark vertical stripes, between which a bright vertical stripe is interposed.
Figure 2:
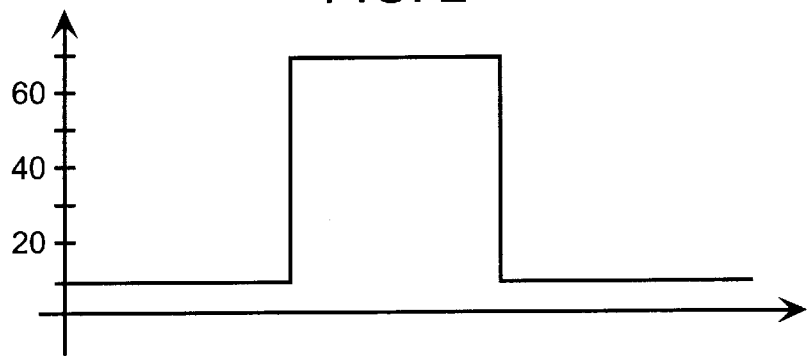
FIG. 2 shows the diagram representing the luminous intensities of each pixel, in the line pointed by the arrow, in the digital image according to FIG. 1.

FIGS. 1 and 2 show a digital image in the form of a pixel matrix, as it should appear in case of full acquisition and reproduction fidelity, that is without noise and statistical variations. The image is composed of 9×6 pixels, represented with squares disposed on a grid made of six lines and nine columns.

The diagram of FIG. 2 shows the curve of intensity related to the third line from above.

In the following description, each pixel $P_{i,j}$ is indicated with a pair of numbers, i indicating the horizontal line, and j the column.

Hence, the diagram 2 shows the intensity of the pixels $P_{3,j}$, with j=1, 2, 3, 4, 5, 6, 7, 8, 9, that is all pixels in the third line from above.

Figure 3:
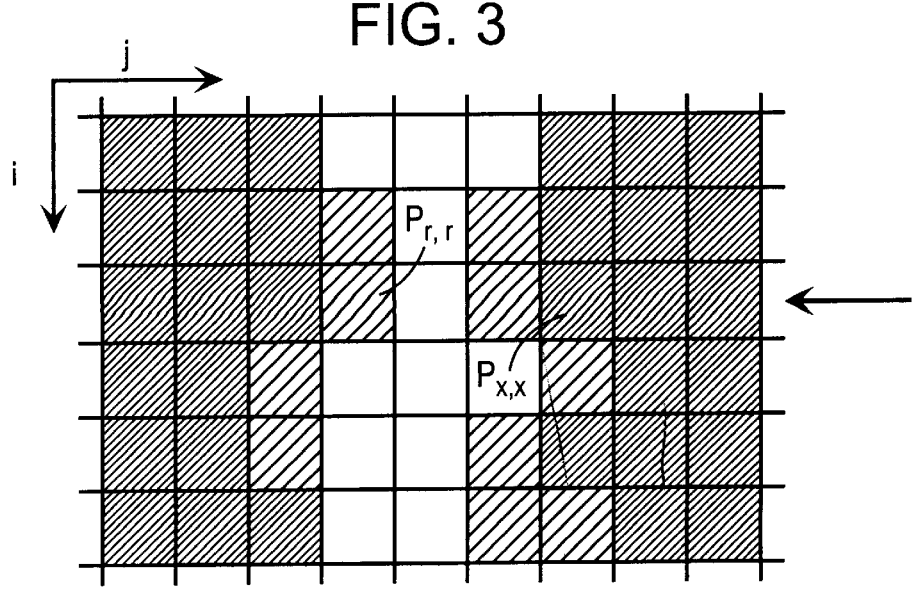
FIG. 3 shows a possible digital image, corresponding to a situation according to that of FIG. 1, as it might be obtained on exit from a low-pass filter and, for example, by a system for nuclear magnetic resonance detection.

FIG. 3 shows a model of a possible digital image, which might be obtained by an acquisition system, such as a device for nuclear magnetic resonance image detection, or a system for echographic image detection. The image shown in FIG. 3, contains, in the passage between bright and dark, pixels which are too dark or too bright. The image shown in FIG. 3 might be either the image received directly by a detection system, or an image resulting from one or more previous processing operations, like, for example, a first filtration with a low-pass filter of any currently known or used type.

Figure 4:
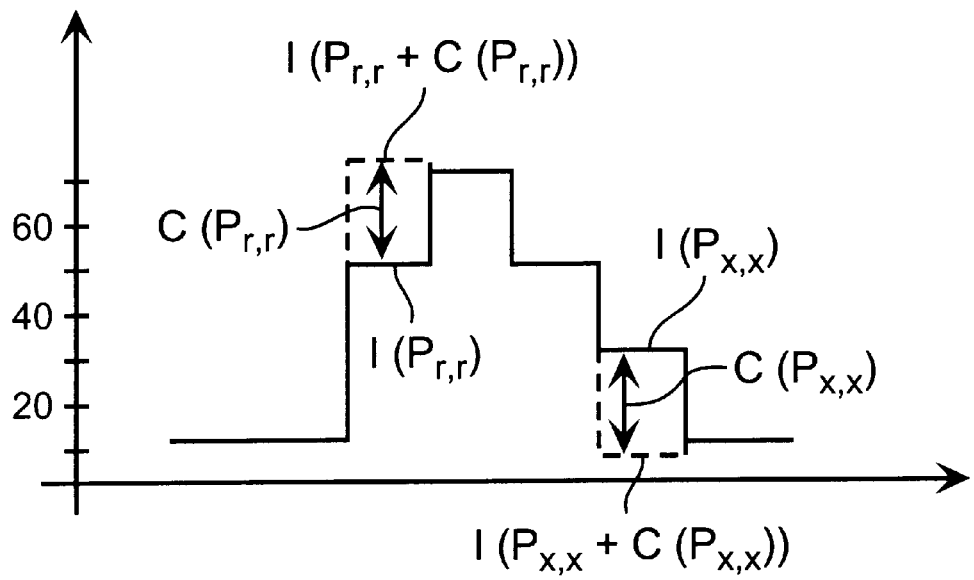
FIG. 4 shows a diagram representing the pixels and their intensities, in the horizontal line of pixels pointed by the arrow, in FIG. 3, whereas the results of the correction of two pixels are shown in a dashed line.

The diagram of FIG. 4 shows the intensities of the pixels $P_{3,j}$, with j=1, 2, 3, 4, 5, 6, 7, 8, 9, that is belonging to the same pixel line as shown in FIGS. 1 and 2.

As is clearly shown, the edges between bright areas and darker ones are no longer well defined, and this involves a blurring effect in the image.

In order to correct this defect without causing the outlines to shift, which would affect the fidelity of the corrected image as compared to the real situation, the invention provides a method consisting of the following steps.

For each pixel of the matrix of pixels comprising the image to be filtered, an area of the image comprising odd numbers of lines and columns is considered, which has, at its center, i.e. at the crossing-point between the central line and the central column, the pixel under examination. The pixels of the examination area are arranged in a matrix, in which, the intensity values of the pixels are stored in their respective positions.

Referring to FIGS. 5 to 9, the pixel under the examination is $P_{3,4}$. The image area considered for filtering will be the one comprising the pixels $P_{k,l}$, with k=1, 2, 3, 4, 5, and with l=2, 3, 4, 5, 6.

If the pixel being filtered is defined as the central pixel of the pixel matrix and, for the sake of simplicity, as $P_{r,r}$, the area will comprise, for a number z of lines and a number w of columns, the pixels $P_{k,l}$, with $$k=r-\frac{1}{2}(z-1), \ldots, r, r+\frac{1}{2}(z-1)$$

and with $$l=r-\frac{1}{2}(w-1), \ldots, r, r+\frac{1}{2}(w-1).$$

In the preferred illustrated example z=w=5.

So, the matrix submitted to the high-pass filtering process, will comprise the intensity values $I_{k,l}$ of the corresponding pixels $P_{k,l}$, that is $I_{k,l}=I(P_{k,l})$ The matrix corresponding to the pixels surrounding the pixel to be filtered is thus multiplied by a filtering matrix for each of the four different directions, corresponding to axes at 0°, 45°, 90°, and 135°.

Advantageously, in the 0° and 90° directions, a matrix $I_{k,l}$ may be considered, which is centered on the intensity value $I_{r,r}$ of the central pixel $P_{r,r}$ to be filtered, and which has only three lines and three columns, whereas the filtering matrices for the 45° and 135° directions, that is the two diagonal directions, have, in the illustrated example, five lines and five columns.

Moreover, the intensity values $I_{k,l}$ of the pixels $P_{k,l}$, surrounding the pixel under examination $P_{r,r}$ may be multiplied by a factor which is a function of their distance from the pixel under examination $P_{r,r}$.

The filtering matrices for the individual 0°, 45°, 90°, 135° directions, i.e. for the horizontal and vertical directions and for the two diagonal directions have the following form:

$$\begin{pmatrix} g1 & g2 & g3 \\ 0 & 0 & 0 \\ g4 & g5 & g6 \end{pmatrix}$$

for the 0° direction, that is for the horizontal direction indicated with O in the figures.

$$\begin{pmatrix} f1 & 0 & f4 \\ f2 & 0 & f5 \\ f3 & 0 & f6 \end{pmatrix}$$

for the 90° direction, that is for the vertical direction, indicated with V in the figures.

$$\begin{pmatrix} 0 & 0 & a3 & 0 & 0 \\ 0 & a2 & 0 & 0 & 0 \\ a1 & 0 & 0 & 0 & a6 \\ 0 & 0 & 0 & a5 & 0 \\ 0 & 0 & a4 & 0 & 0 \end{pmatrix}$$

for the 45° direction, that is for one of the two diagonal directions, indicated with D1.
and $$\begin{pmatrix} 0 & 0 & b4 & 0 & 0 \\ 0 & 0 & 0 & b5 & 0 \\ b1 & 0 & 0 & 0 & b6 \\ 0 & b2 & 0 & 0 & 0 \\ 0 & 0 & b3 & 0 & 0 \end{pmatrix}$$

for the 135° direction, that is for one of the two diagonal directions, indicated with D2.

In which the factors f1, g1, a1, b1, with i=1, 2, . . . , 6, are weighting factors for the intensity values of the pixels surrounding the pixel under examination, that is the central pixel $P_{r,r}$ to be filtered, said factors being functions of the distance of the corresponding pixel from the pixel being filtered $P_{r,r}$.

The dependence of the values fi, gi, ai, bi on the distance of the corresponding pixel from the pixel under examination is inversely proportional to said distance.

Among the different available choices, advantages result from choosing f1=f3=−f4=−f6 and f2=−f5; and accordingly g1=g3=−g4=−g6 and g2=−g5; a1=a3=−a4=−a6 and a2=−a5; and b1=b3=−b4=−b6 and b2=−b5.

A further advantageous, but not compulsory choice is providing also f1=g1=a1=b1 and f2=g2=a2=b2.

Several choices are possible for the functions fi, gi, ai, bi. In the illustrated embodiment, the choice has been f1=f3=−f4=−f6=g1=g3=−g4=−g6=a1=a3=−a4=−a6=b1=b3=−b4=−b6=1 and f2=−f5=g2=−g5=a2=−a5=b2=−b5=2, thus obtaining the following directional filtering matrices.

$$\begin{pmatrix} -1 & -2 & -1 \\ 0 & 0 & 0 \\ 1 & 2 & 1 \end{pmatrix}$$

for the 0° direction, that is for the horizontal direction indicated with O in the figures.

$$\begin{pmatrix} -1 & 0 & 1 \\ -2 & 0 & 2 \\ -1 & 0 & 1 \end{pmatrix}$$

for the 90° direction, that is for the vertical direction, indicated with V in the figures.

$$\begin{pmatrix} 0 & 0 & -1 & 0 & 0 \\ 0 & -2 & 0 & 0 & 0 \\ -1 & 0 & 0 & 0 & 1 \\ 0 & 0 & 0 & 2 & 0 \\ 0 & 0 & 1 & 0 & 0 \end{pmatrix}$$

for the 45° direction, that is for one of the two diagonal directions, indicated with D1.
and $$\begin{pmatrix} 0 & 0 & -1 & 0 & 0 \\ 0 & 0 & 0 & -2 & 0 \\ +1 & 0 & 0 & 0 & 1 \\ 0 & 2 & 0 & 0 & 0 \\ 0 & 0 & 1 & 0 & 0 \end{pmatrix}$$

for the 135° direction, that is for one of the two diagonal directions, indicated with D2.

The multiplication of these matrices, hereafter indicated with $\otimes$, is defined as the sum of the products of the corresponding elements of the two matrices, i.e. those having the same positions, that is:

$$A \otimes B = \begin{pmatrix} a_{1,1} & a_{1,n} \\ a_{m,1} & a_{m,n} \end{pmatrix} \otimes \begin{pmatrix} b_{1,1} & b_{1,n} \\ b_{m,1} & b_{m,n} \end{pmatrix} = \sum_{i=1,m} \sum_{j=1,n} a_{ij} b_{ij}$$

This multiplication of the above matrices by the corresponding matrix 3×3 or 5×5 related to the intensities $I_{k,l}$ of the pixels $P_{k,l}$, the definition of the modulus of the multiplication result and the division of the sum of fi, gi, ai, bi with i=1, 2, 3, by said modulus, generate a value for each direction, which is the modulus of the difference between the mean of the intensities M (dir, 1) and M (dir, 2) of the pixels $P_{k,l}$, situated on one side of the pixel $P_{r,r}$ being filtered and that of the pixels $P_{k,l}$, situated on the other side of the pixel $P_{r,r}$ being filtered, with reference to the corresponding 0°, 45°, 90° or 135° direction. The modulus of the difference between the means M (dir, 1) and M (dir, 2) of the pixels $_{k,l}$ on the opposite sides of the pixel being filtered $P_{r,r}$ is used to calculate the intensity correction for the pixel being filtered $P_{r,r}$ in the corresponding direction and which, in the present disclosure and in the claims is defined as a directional correction C (dir), that is to say, with reference to the illustrated examples, according to the 0°, 45°, 90°, 135° directions.

The final correction of the pixel being filtered is obtained through a weighted and normalized addition of the individual directional corrections.

Particularly, the directional correction is given by the modulus of the difference between the means M (dir, 1) and M (dir, 2) of the pixels $P_{k,l}$ on the opposite sides of the pixel being filtered $P_{r,r}$ in the corresponding direction.

The weighting operation is performed by multiplying each directional correction C (dir) by a factor Q (dir), which is different for each of the directional corrections provided and, particularly, may be the value C (dir) itself for each direction.

The directional corrections C (dir), with dir=0°, 45°, 90°, 135°, and the corresponding weighting values Q (dir) are absolute values, and bear no sign. In order to determine which of the signs (+) or (−) each directional correction shall be assigned, while adding them up to determine the correction for the pixel being filtered $P_{r,r}$, the process according to the invention provides threshold values, calculated for every filtering direction, the intensity value $I_{r,r}$ of the pixel being filtered $P_{r,r}$ being compared thereto.

In a first embodiment, the directional threshold, indicated with S (dir), in which dir=0°, 45°, 90°, 135°, is calculated as follows:

$$S(0°) = \left[ \frac{1}{2\left|\sum_{i=1,2,3} gi\right|} \text{modulus} \begin{pmatrix} g1 & g2 & g3 \\ 0 & 0 & 0 \\ 0 & 0 & 0 \end{pmatrix} + \right.$$

$$\left. \frac{1}{2\left|\sum_{i=4,5,6} gi\right|} \text{modulus} \begin{pmatrix} 0 & 0 & 0 \\ 0 & 0 & 0 \\ g4 & g5 & g6 \end{pmatrix} \right] \otimes$$

$$\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

in which the modulus function ( ) is defined as the matrix of the moduli, i.e. of the absolute values of the matrix elements.

The same is obtained for the other directions:

$$S(90°) =$$

$$\left[ \frac{1}{2\left|\sum_{i=1,2,3} fi\right|} \text{modulus} \begin{pmatrix} f1 & 0 & 0 \\ f2 & 0 & 0 \\ f3 & 0 & 0 \end{pmatrix} + \frac{1}{2\left|\sum_{i=4,5,6} fi\right|} \text{modulus} \begin{pmatrix} 0 & 0 & f4 \\ 0 & 0 & f5 \\ 0 & 0 & f6 \end{pmatrix} \right] \otimes$$

$$\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$S(45°) = \left[ \frac{1}{2\left|\sum_{i=1,2,3} ai\right|} \text{modulus} \begin{pmatrix} 0 & 0 & a3 & 0 & 0 \\ 0 & a2 & 0 & 0 & 0 \\ a1 & 0 & 0 & 0 & 0 \\ 0 & 0 & 0 & 0 & 0 \\ 0 & 0 & 0 & 0 & 0 \end{pmatrix} + \right.$$

-continued $$\frac{1}{2\left|\sum_{i=4,5,6} ai\right|} \text{modulus} \begin{pmatrix} 0 & 0 & 0 & 0 & 0 \\ 0 & 0 & 0 & 0 & 0 \\ 0 & 0 & 0 & 0 & a6 \\ 0 & 0 & 0 & a5 & 0 \\ 0 & 0 & a4 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$S(135°) = \left[ \frac{1}{2\left|\sum_{i=1,2,3} bi\right|} \text{modulus} \begin{pmatrix} 0 & 0 & 0 & 0 & 0 \\ 0 & 0 & 0 & 0 & 0 \\ b1 & 0 & 0 & 0 & 0 \\ 0 & b2 & 0 & 0 & 0 \\ 0 & 0 & b3 & 0 & 0 \end{pmatrix} + \right.$$

$$\frac{1}{2\left|\sum_{i=4,5,6} bi\right|} \text{modulus} \begin{pmatrix} 0 & 0 & b4 & 0 & 0 \\ 0 & 0 & 0 & b5 & 0 \\ 0 & 0 & 0 & 0 & b6 \\ 0 & 0 & 0 & 0 & 0 \\ 0 & 0 & 0 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

This mean is used to define a threshold value $S(0°)$, $S(45°)$, $S(90°)$, $S(135°)$, for each $0°$, $45°$, $90°$, $135°$ direction.

The above thresholds, which will be named, hereafter and in the claims, directional thresholds, are compared to the intensity $I_{r,r}$ of the central pixel $P_{r,r}$ being filtered. This comparison determines the sign of the filtering correction to be applied to the intensity $I_{r,r}$ of the pixel $P_{r,r}$ being filtered, so that the correction is positive when $I_{r,r}$ is higher than the value of its respective directional threshold, whereas the correction is negative when $I_{r,r}$ is lower than the value of said directional value, this operation being executed for every directional threshold.

The global correction is obtained through the following formula:

$$C(P_{r,r}) = \frac{\sum_{dir=0°,45°,90°,135°} C(dir) \times Q(dir) \times \text{sign}[I(P_{r,r}) - S(dir)]}{\sum_{dir=0°,45°,90°,135°} Q(dir)}$$

in which sign(x) is the function which takes the value (−1) when x<0 and (+1) when x>0.

In the example illustrated in FIGS. 5 to 9, the pixel $P_{r,r}$ has the value of 50, and the directional thresholds are indicated with $S(0°)$, $S(45°)$, $S(90°)$, $S(135°)$. The values of fi, gi, ai, bi, wth i=1, 2, 3, 4, 5, 6 are those indicated hereinbefore, that is f1=f3=−f4=−f6=g1=g3=−g4=−g6=a1=a3=−a4=−a6=b1=b3=−b4=−b6=1 and f2=−f5=g2=−g5=a2=−a5=b2=−b5=2

In the example illustrated in FIGS. 5 to 9, the pixel matrices $P_{k,l}$ have the following values:

$$\begin{pmatrix} 10 & 50 & 70 \\ 10 & 50 & 70 \\ 50 & 70 & 70 \end{pmatrix}$$

in the 0° and 90° directions and $$\begin{pmatrix} 10 & 10 & 70 & 70 & 70 \\ 10 & 10 & 50 & 70 & 50 \\ 10 & 10 & 50 & 70 & 50 \\ 10 & 50 & 70 & 70 & 70 \\ 10 & 50 & 50 & 70 & 50 \end{pmatrix}$$

for the 45° and 135° directions

When the above is applied, the following thresholds are obtained:

$S(0°)=55>I(P_{r,r})=50$;
   directional correction sign: (31 1)
   weighted directional correction: $|20|\times|20|=400$ $S(90°)=45<I(P_{r,r})=50$;
   directional correction sign: (30 1)
   weighted directional correction: $|50|\times|50|=2500$ $S(45°)=52\cdot5>I(P_{r,r})=50$;
   directional correction sign: (−1)
   weighted directional corrections: $|25|\times|25|=625$ $S(135°)=42\cdot5<I(P_{r,r})=50$;
   directional correction sign: (+1)
   weighted directional correction: $|35|\times|35|=1225$ Therefore, the global correction of the pixel $P_{r,r}$ is $$\frac{2500 + 1225 - 400 - 625}{50 + 25 + 35 + 20} = +20.7$$

Figure 5:
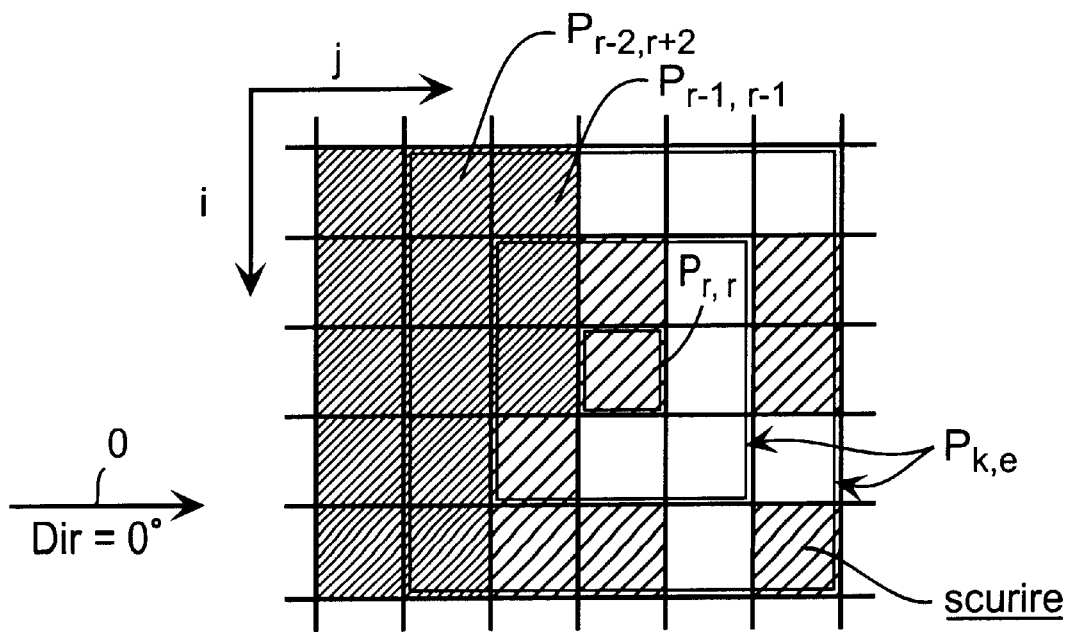
FIG. 5 shows the area of the image or of the pixel matrix of FIG. 3, which is considered for high-pass filtering of the pixel $P_{3,4}$ through the process according to the invention.
Figure 6:
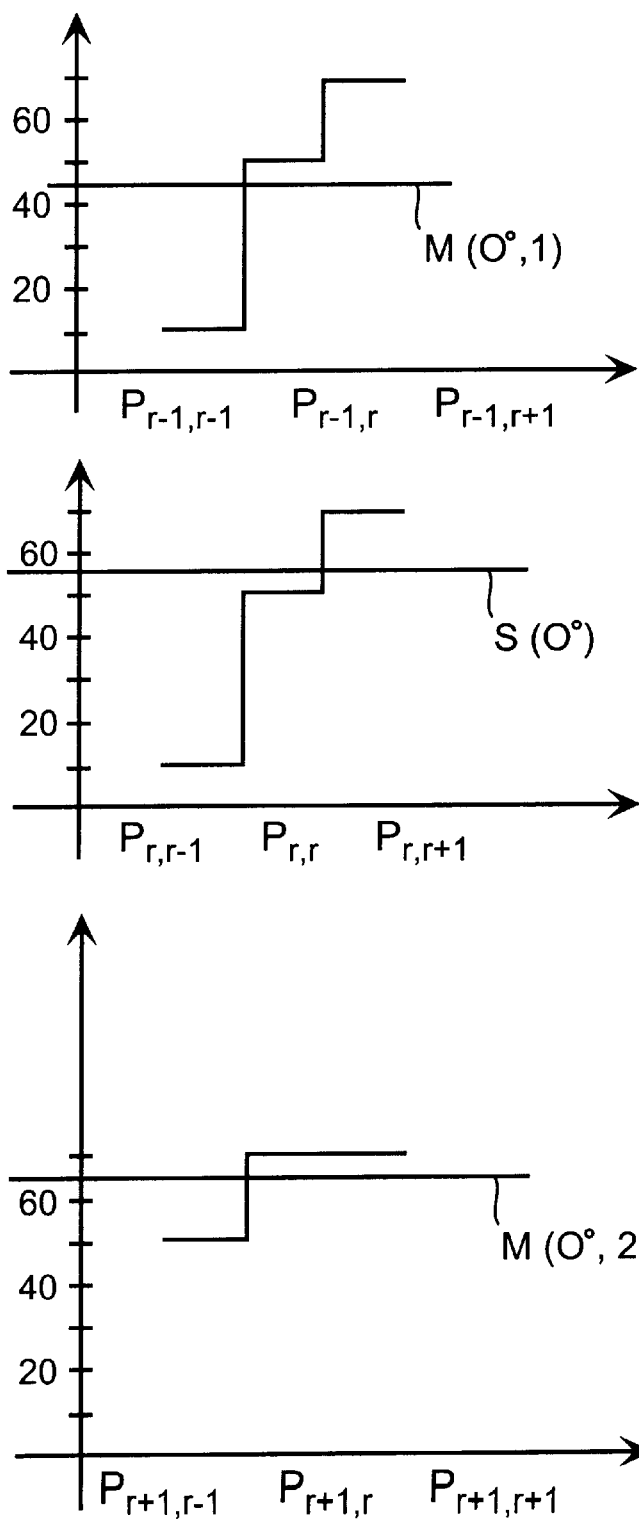
FIG. 6 shows the diagrams of three horizontal lines of pixels, i.e. an upper line, an intermediate line, containing the pixel under examination and the two opposed pixels on the left and on the right thereof, and a lower line, and of a corresponding threshold for the horizontal direction.
Figure 7:
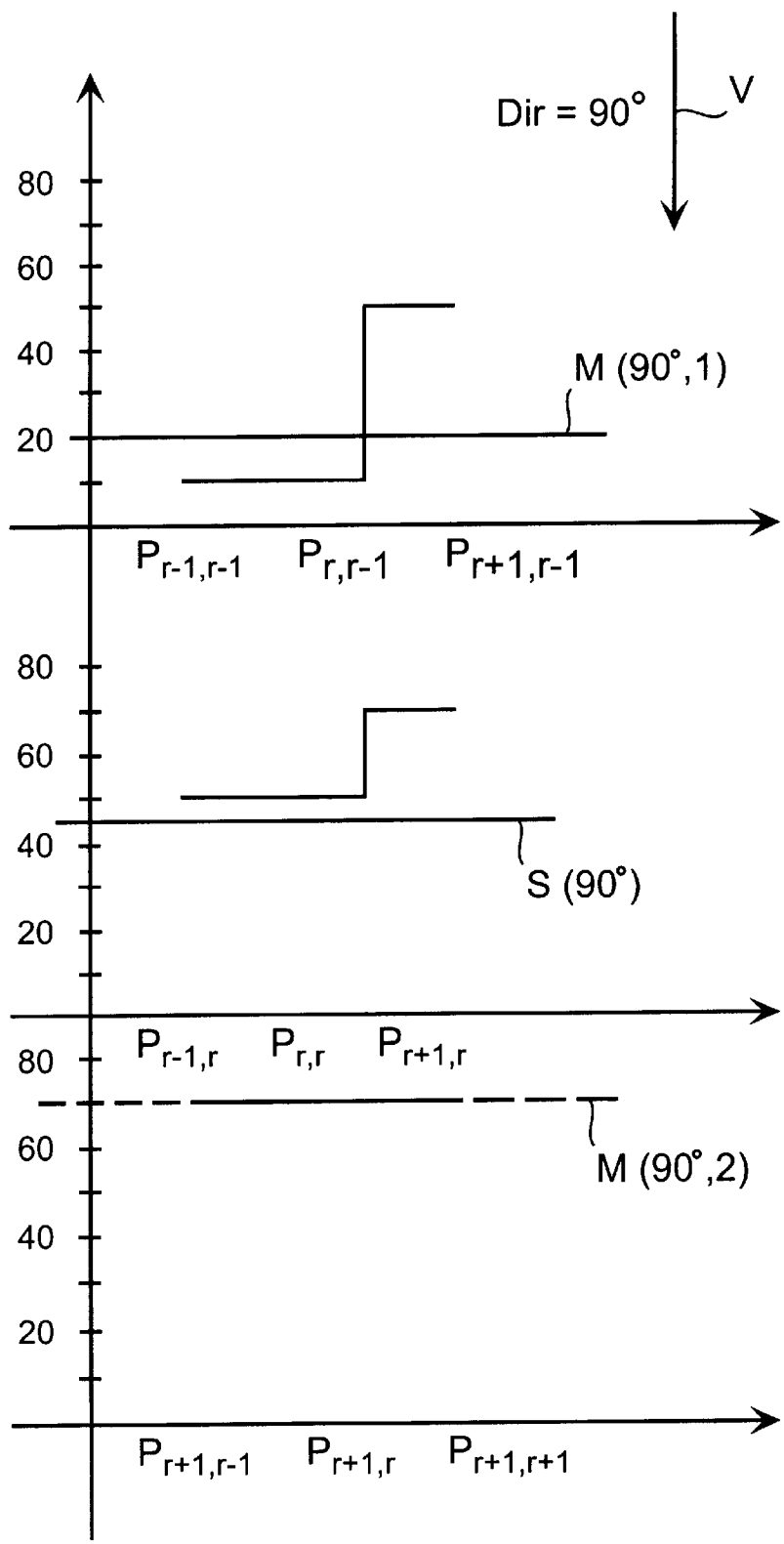
FIG. 7 shows, like FIG. 6, the intensity diagrams of three columns of pixels, i.e. left, intermediate, and central, in which the intermediate column has, at its center position, the pixel under examination.
Figure 8:
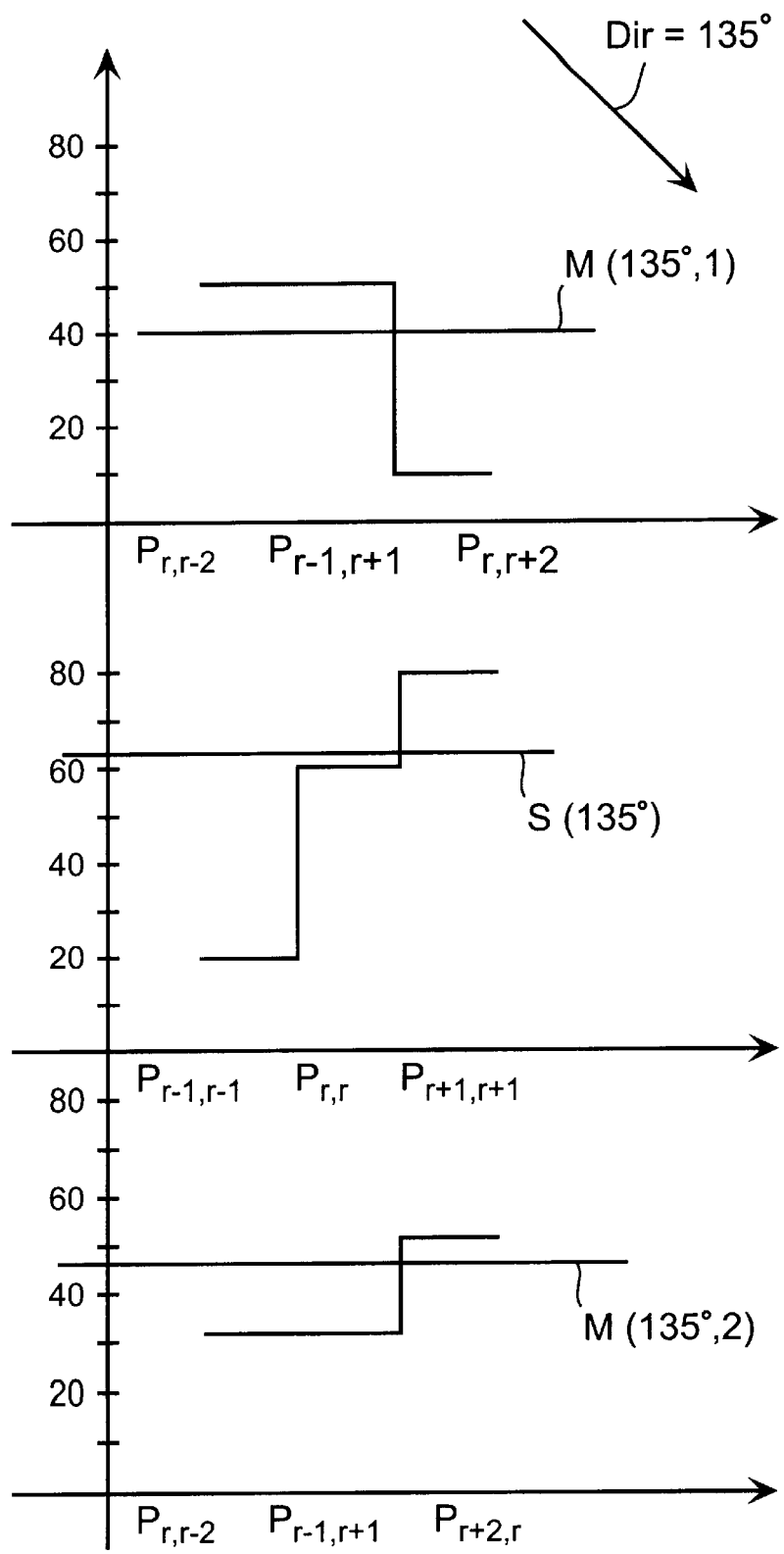
FIGS. 8 and 9 show, like the previous FIGS. 6 and 7, the intensity diagrams of the pixels in the two diagonal directions, the pixel under examination being still provided in the diagonal intermediate line, and in the center position.
Figure 9:
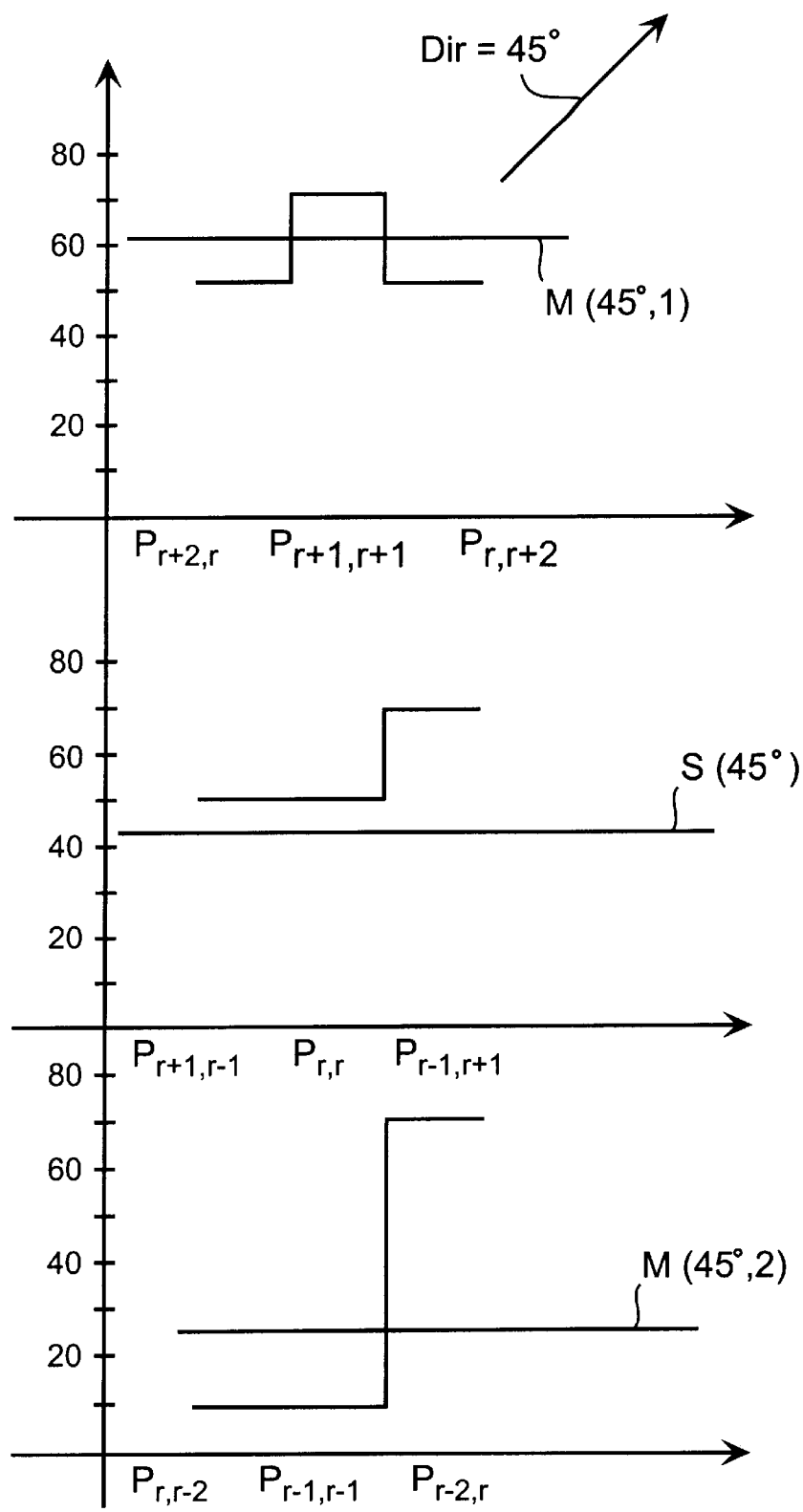
Figure 10:
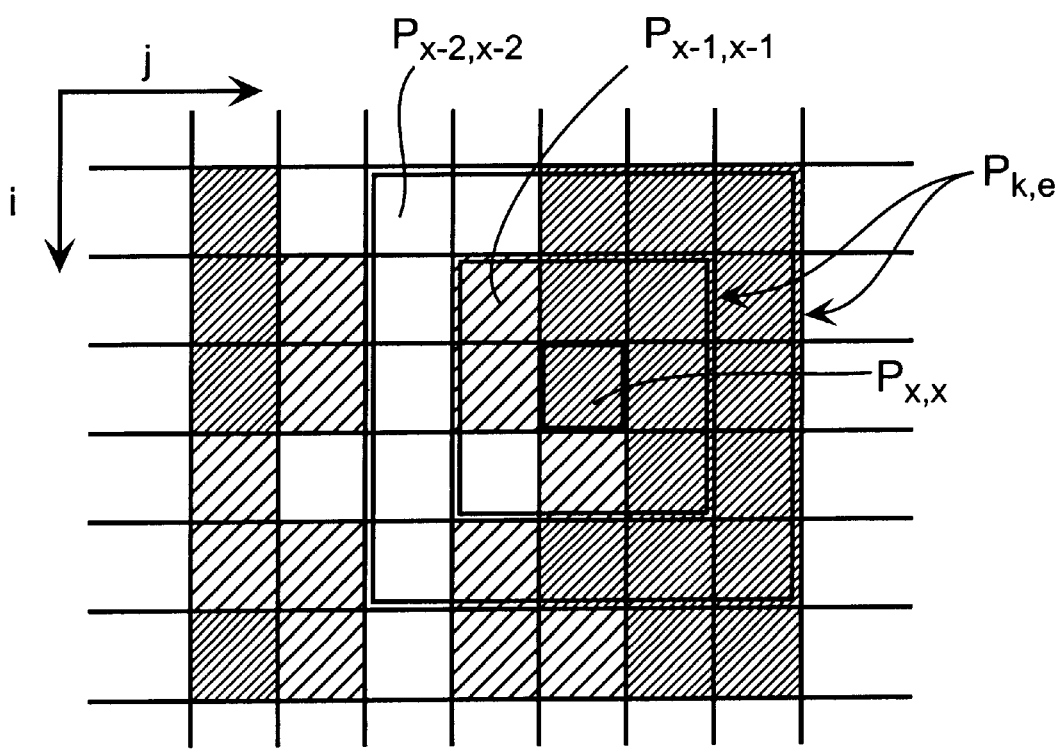
FIG. 10 shows an area of the digital image according to FIG. 3, which is considered for high-pass filtering of another pixel under examination $P_{3,7}$.
Figure 11:
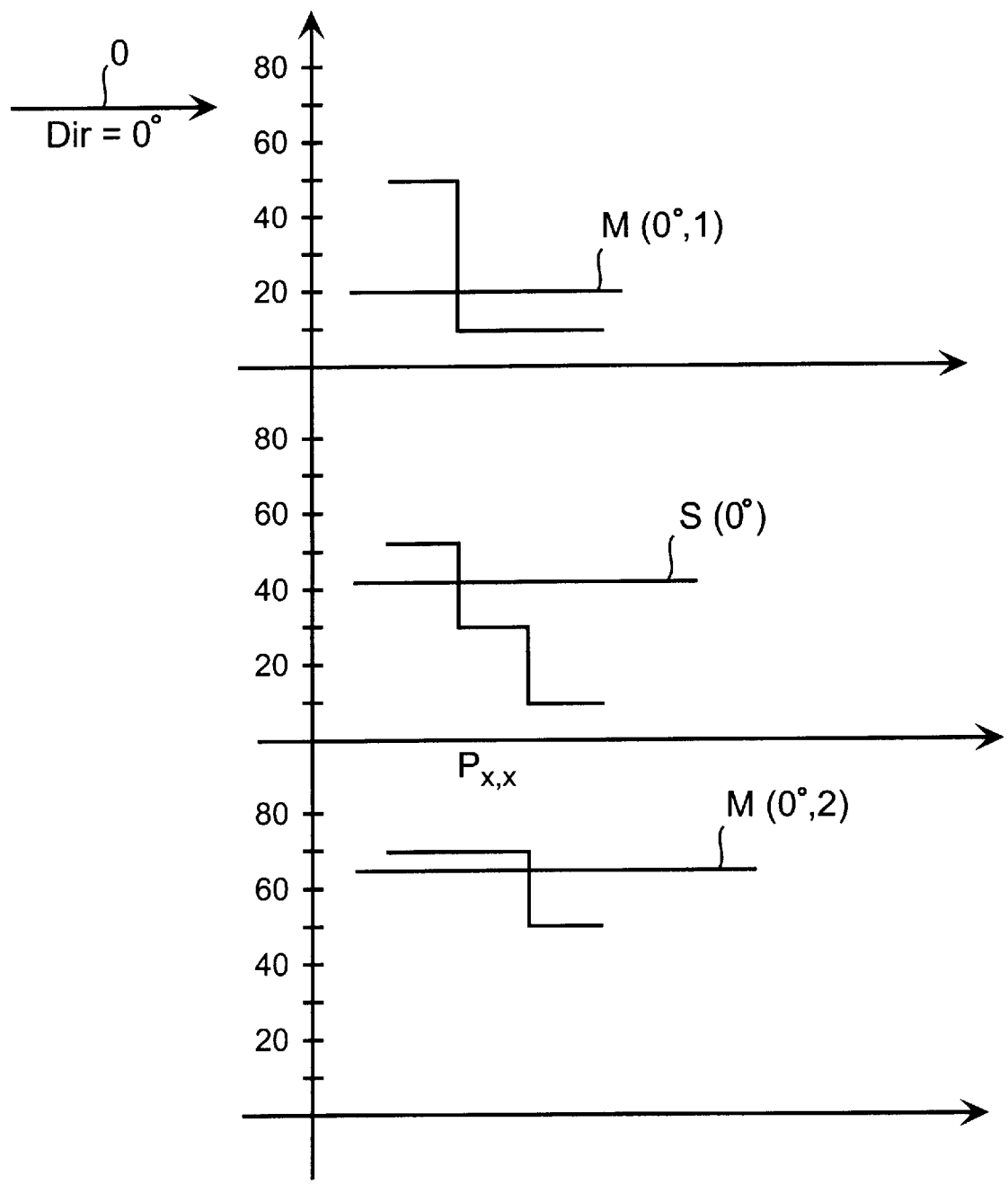
FIGS. 11, 12, 13, 14 show the intensity diagrams of the pixels in the horizontal and vertical direction, and in the two diagonal directions respectively, like in the description of FIGS. 6 to 9, and with the pixel under examination still being in the center position of the corresponding central line.
Figure 12:
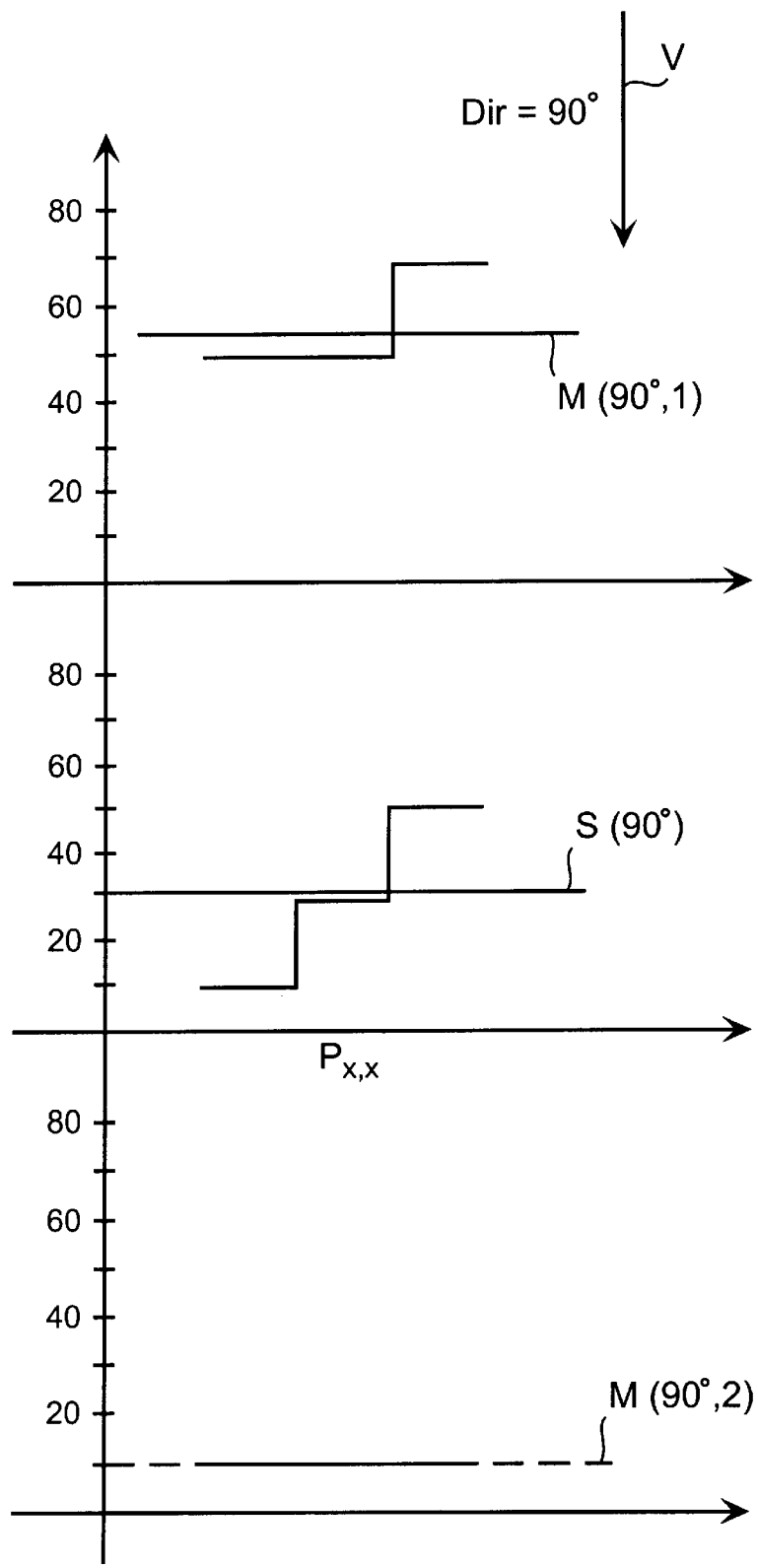
Figure 13:
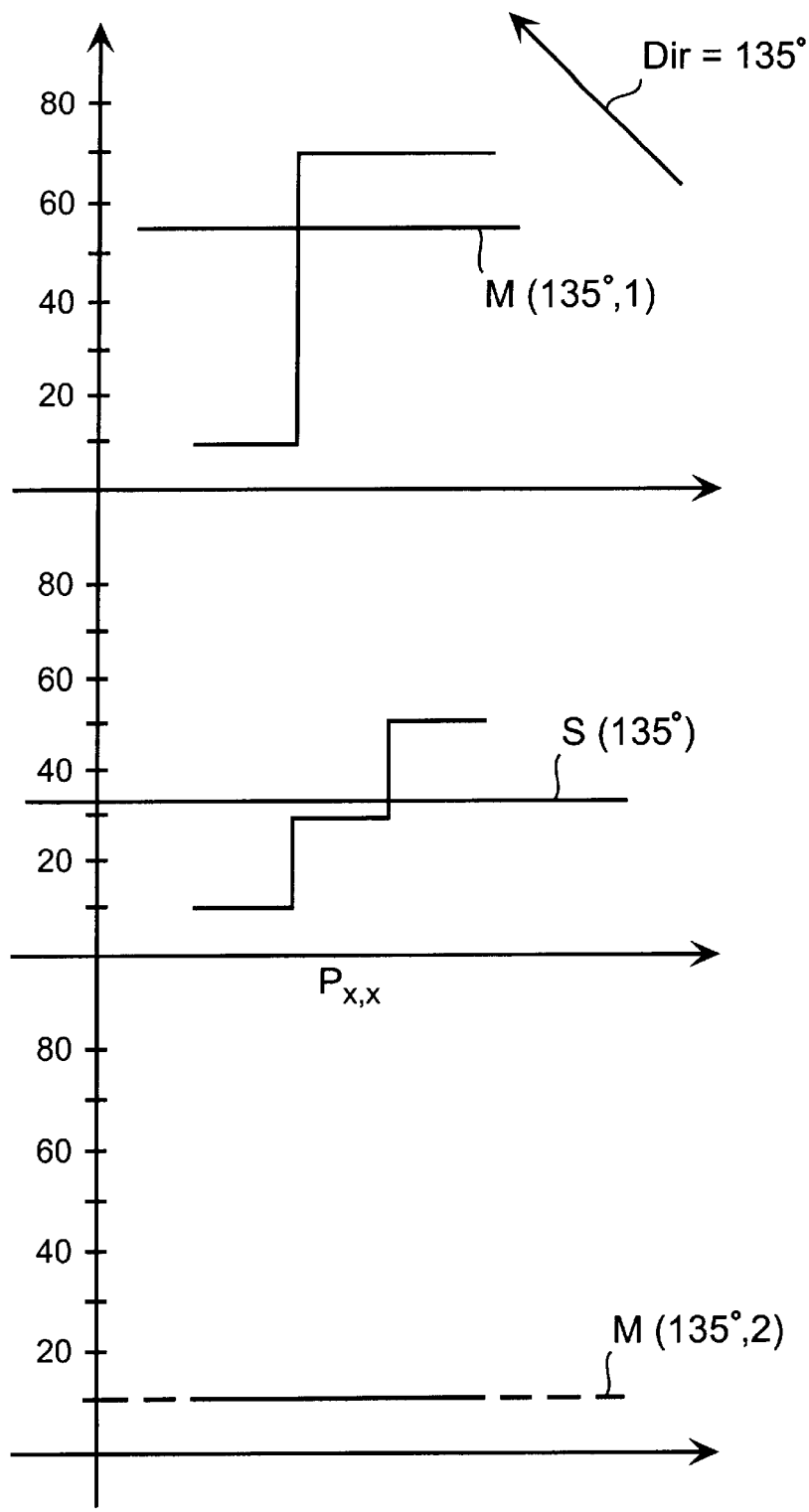
Figure 14:
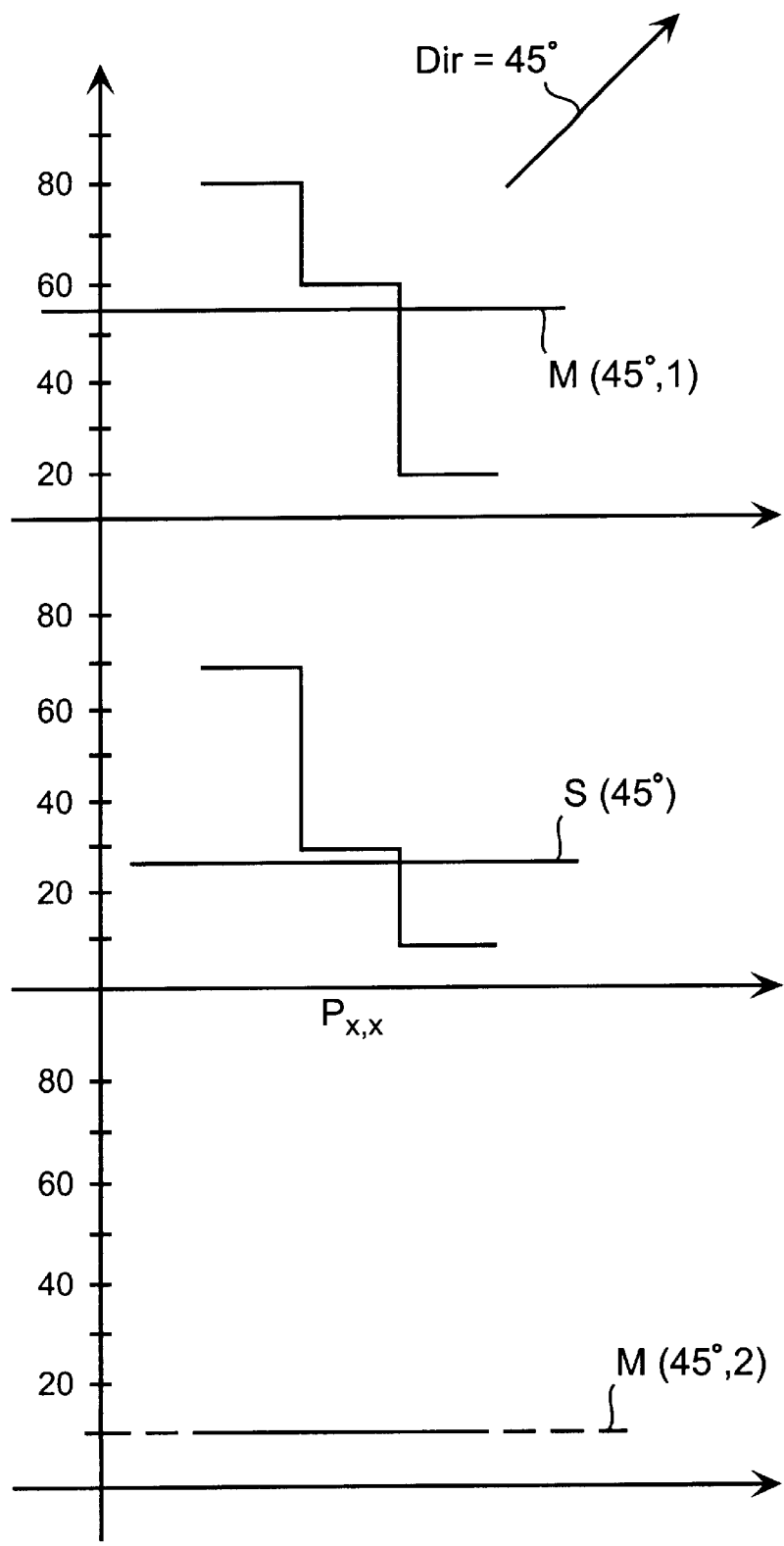

The filtering process according to the invention increases the intensity of the pixel $P_{r,r}$ according to FIGS. 5 to 6, from I=50 to I=70·7.

FIGS. 10 to 14 show the area to be examined for filtering another pixel $P_{x,x}$.

The process is the same as described above as regards FIGS. 5 to 9. In this case, the matrices describing the intensity of the pixels which are relevant for the filtering operation and are centered on the pixel being filtered $P_{x,x}$ are as follows:

$$\begin{pmatrix} 50 & 10 & 10 \\ 50 & 30 & 10 \\ 70 & 50 & 10 \end{pmatrix}$$

in the 0° and 90° directions and $$\begin{pmatrix} 70 & 70 & 10 & 10 & 10 \\ 70 & 50 & 10 & 10 & 10 \\ 70 & 50 & 30 & 10 & 10 \\ 70 & 70 & 50 & 10 & 10 \\ 70 & 50 & 10 & 10 & 10 \end{pmatrix}$$

for the 45° and 135° directions
the pixel $P_{x,x}$ being filtered has an intensity $I(P_{x,x})=30$.

When the above is applied, the following thresholds are obtained:

$S(0°)=32·5>I(P_{x,x})=30$;
   directional correction sign: (−1)
   weighted directional correction: $|25|\times|25|=625$
$S(90°)=32·5>I(P_{x,x})=30$;
   directional correction sign: (−1)
   weighted directional correction: $|45|\times|45|=2025$
$S(45°)=32·5>I(P_{x,x})=30$;
   directional correction sign: (−1)
   weighted direction correction: $|45|\times|45|=2025$
$S(135°)=27·5<I(P_{x,x})=30$;
   directional correction sign: (+1)
   weighted directional correction: $|35|\times|35|=1225$ Therefore, the global correction of the pixel $P_{x,x}$ is $$\frac{-625-2025-2025+1225}{25+45+45+35}=-23$$

The filtering process according to the invention decreases the intensity of the pixel $P_{x,x}$ according to FIGS. 10 to 14 by 23, from I=30 to I=7.

The corrections obtained for both cases of FIGS. 5 to 9, i.e. for the pixel $P_{r,r}$ and of FIGS. 10 to 14, i.e. for the pixel $P_{x,x}$ are represented in the diagram of FIG. 4 with dashed lines.

The filtering process is repeated for every pixel $P_{i,j}$ of the image and provides a matrix for the correction of original intensities, which is as large as the original image, or as one portion thereof.

According to another improvement of the invention, the corrections of each pixel $C(P_{r,r})$, obtained through filtering, may be multiplied by a further attenuation and/or, in case, enhancement weight. The weight may be obtained empirically, through a direction evaluation of the effect on the displayed image. The weight may be different for each correction $C(P_{r,r})$ or identical for all corrections of the individual pixels and is generally used to attenuate the correction, and is defined to be the same for all pixels being filtered.

The reference for the filtering algorithm is still the original digital image, and the corrected intensity values are only used to produce the new filtered image, and are not involved during filtering.

According to a variant of the process described above, different matrices for directional filtering may be used, for example for diagonal directions.

Particularly, by using filtering matrices like $$\begin{pmatrix} a2 & a3 & 0 \\ a1 & 0 & a6 \\ 0 & a4 & a5 \end{pmatrix}$$

and $$\begin{pmatrix} 0 & b4 & b5 \\ b1 & 0 & b6 \\ b2 & b3 & 0 \end{pmatrix}$$

for diagonal directions, a single 3×3 matrix may be used for all steps of directional filtering, and it is not necessary to isolate two different fields of the digital image, centered on the pixel being filtered $P_{r,r}$ or $P_{x,x}$.

The rest of the process remains unvaried and as described.

The process according to these two embodiments is very abrupt, as it suddenly increases or reduces the intensity of the pixel $P_{r,r}$ or $P_{x,x}$ being filtered. This discrete operation, of the on-off type may generate saw-profiled lines, that is with a slight zigzag profile.

In order to reduce this saw-tooth effect, the invention provides the improvement of setting a statistical weighting factor of the individual directional corrections C (dir), accounting for the distance between the original value of the pixel being filtered, and the corresponding directional threshold S(dir).

The weighting factor may be any function of the modulus of the difference between the value of the directional threshold and the intensity of the pixel being filtered.

Preferably, the dependence of the weighting factor on the modulus of the difference between the directional threshold value and the intensity of the pixel being filtered is a discrete function which assigns each quantity range or interval of said difference a fixed value, there being provided a weighting factor 1, for very high difference values, whereas, for smaller difference values, the weighting factor is a predetermined fraction.

According to a particular embodiment, the intervals used to calculate the additional weighting factor for a directional correction are obtained by defining several thresholds, i.e., at least three directional thresholds.

The thresholds are always calculated starting from the mean of the mean values of the neighboring pixels on the two opposite sides of the pixel $P_{r,r}$ being filtered, and with reference to the direction under examination.

The definition of the intensity mean of the pixels $P_{k,l}$ on the opposite sides of the pixel $P_{r,r}$ being filtered with reference to the direction M(dir,1) and M(dir,2), with $$M(0°,1)=\frac{1}{\sum_{i=1,2,3}gi}\begin{pmatrix} g1 & g2 & g3 \\ 0 & 0 & 0 \\ 0 & 0 & 0 \end{pmatrix}\otimes\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$M(0°,2)=\frac{1}{\sum_{i=4,5,6}gi}\begin{pmatrix} 0 & 0 & 0 \\ 0 & 0 & 0 \\ g4 & g5 & g6 \end{pmatrix}\otimes\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

in which the symbol $\otimes$ indicates the particular product defined above.

The same is provided for the other directions:

$$M(90°,1)=\frac{1}{\sum_{i=1,2,3}fi}\begin{pmatrix} f1 & 0 & 0 \\ f2 & 0 & 0 \\ f3 & 0 & 0 \end{pmatrix}\otimes\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

-continued $$M(90°, 2) = \frac{1}{\sum_{i=4,5,6} fi} \begin{pmatrix} 0 & 0 & f4 \\ 0 & 0 & f5 \\ 0 & 0 & f6 \end{pmatrix} \otimes \begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$M(45°, 1) = \frac{1}{\sum_{i=1,2,3} ai} \begin{pmatrix} 0 & 0 & a3 & 0 & 0 \\ 0 & a2 & 0 & 0 & 0 \\ a1 & 0 & 0 & 0 & 0 \\ 0 & 0 & 0 & 0 & 0 \\ 0 & 0 & 0 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$M(45°, 2) = \frac{1}{\sum_{i=4,5,6} ai} \begin{pmatrix} 0 & 0 & 0 & 0 & 0 \\ 0 & 0 & 0 & 0 & 0 \\ 0 & 0 & 0 & 0 & a6 \\ 0 & 0 & 0 & a5 & 0 \\ 0 & 0 & a4 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$M(135°, 1) = \frac{1}{\sum_{i=1,2,3} bi} \begin{pmatrix} 0 & 0 & 0 & 0 & 0 \\ 0 & 0 & 0 & 0 & 0 \\ b1 & 0 & 0 & 0 & 0 \\ 0 & b2 & 0 & 0 & 0 \\ 0 & 0 & b3 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$M(135°, 2) = \frac{1}{\sum_{i=4,5,6} bi} \begin{pmatrix} 0 & 0 & b4 & 0 & 0 \\ 0 & 0 & 0 & b5 & 0 \\ 0 & 0 & 0 & 0 & b6 \\ 0 & 0 & 0 & 0 & 0 \\ 0 & 0 & 0 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

therefore, it is possible to calculate the individual threshold values by a number k, with k=1, ..., n of threshold:

$$S(dir,k) \leq [(n+1-k) \times M(dir,1) + k \times M(dir,2)]/(n+1)$$

With the fi, gi, ai, bi values as defined in the previous description, and with a number n=3 thresholds, the result is as follows:

$$S(dir,1) = [3M(dir,1) + M(dir,2)]/4$$

$$S(dir,2) = [M(dir,1) + M(dir,2)]/2$$

$$S(dir,3) = [M(dir,1) + 3M(dir,2)]/4$$

The thresholds 1, 2, 3 divide the difference between the means of the pixels $P_{k,l}$ on the two opposing sides of the pixel being filtered $P_{r,r}$, and in the corresponding direction, into four intervals.

When the intensity $I(P_{r,r})$ of the pixel being filtered falls within the outmost intervals, that is below the lowest thresholds S(1) or above the highest threshold S(3), then the weighting factor of the directional correction C(dir) for the pixel $P_{r,r}$ being filtered is 1. When said intensity $I(P_{r,r})$ of the pixel being filtered $P_{r,r}$ falls in the intervals situated between the two outmost thresholds S(1) and S(3) and the central threshold S(2), then the weighting factor of the corresponding directional correction C(dir) is a fraction of 1, for example 0.5.

Figure 15:
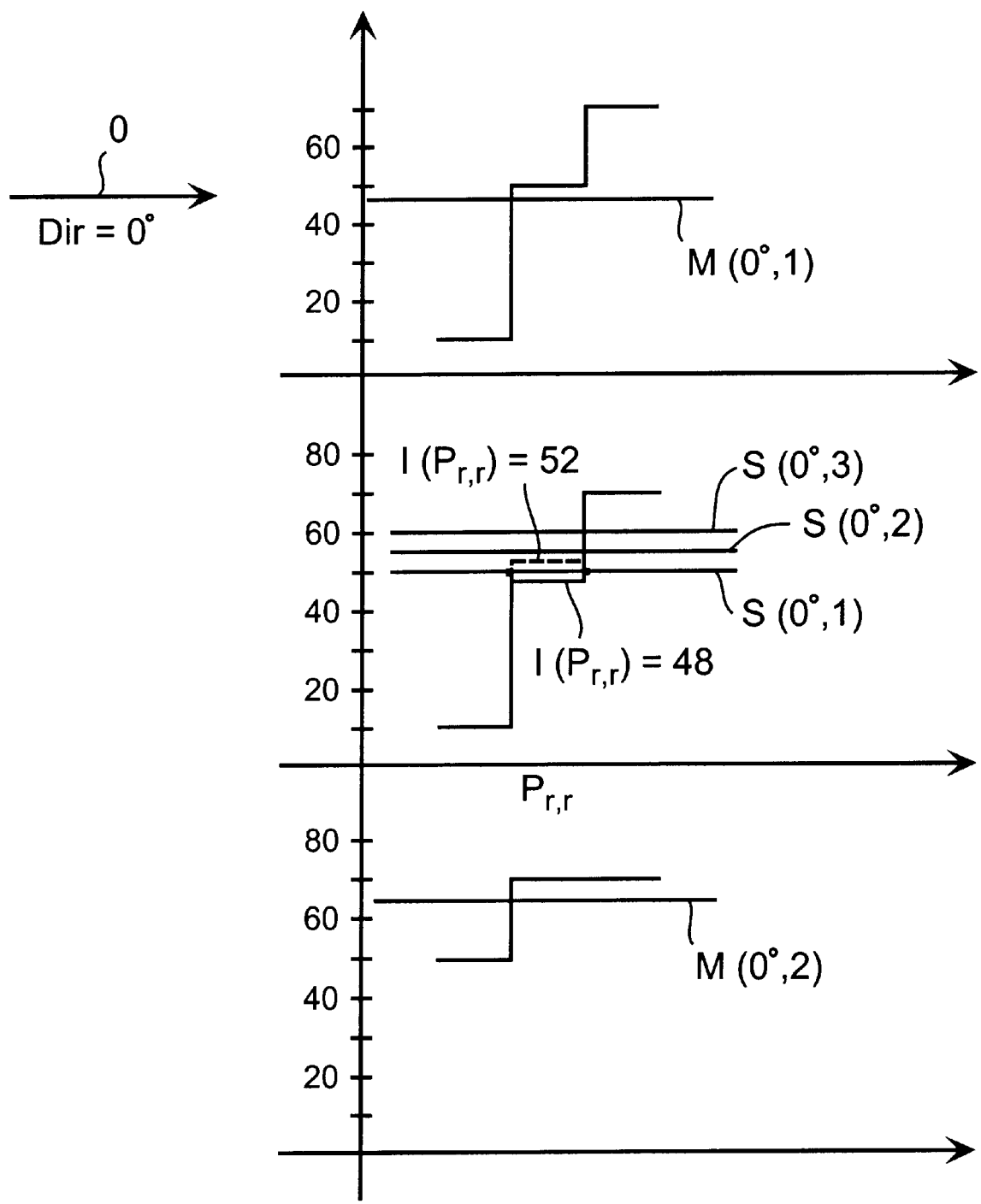
FIG. 15 shows the variant embodiment, wherein the corrections are obtained by using three directional thresholds for different intensities of pixel being filtered.

FIG. 15 shows the intensity diagram of the three pixels $P_{r,r-1}$, $P_{r,r}$ and $P_{r,r+1}$, which are aligned with the pixel being filtered $P_{r,r}$ in the horizontal direction of the image, that is of an area of the image, made of nine pixels, whose center is a pixel being filtered $P_{r,r}$ with different values of $I(P_{r,r})$.

The remaining pixels $P_{k,l}$ are like in the previous example of FIGS. 5 to 9, that is:

$$\begin{pmatrix} 10 & 50 & 70 \\ 10 & I(P_{r,r}) & 70 \\ 50 & 70 & 70 \end{pmatrix}$$

in the 0° and 90° directions and $$\begin{pmatrix} 10 & 10 & 70 & 70 & 70 \\ 10 & 10 & 50 & 70 & 50 \\ 10 & 10 & I(P_{r,r}) & 70 & 50 \\ 10 & 50 & 70 & 70 & 70 \\ 10 & 50 & 50 & 70 & 50 \end{pmatrix}$$

for the 45° and 135° directions.

S(0°,1), S(0°,2) and S(0°,3) indicate the three thresholds which have been defined as generally described above and S(0°,1)=50, S(0°,2)=55, S(0°,3)=60.

The directional correction C(0°), as calculated in the previous example is of (−400). According to the improvement, if the intensity of the pixel $P_{r,r}$ is of 48, and so falls within the first interval below the threshold S(0°,1), then the directional correction C(0°) is multiplied by a weight W=1. So the global correction will be calculated, while taking C(0°)×W as (−400).

If the intensity of $P_{r,r}$ were of 52, then it would fall within the second interval between the lowest threshold S(0°,1) and S(0°,2). In this case, the weighting factor W of the directional correction (−400) is, for example, W=0.5. Therefore, in the combination of the individual directional corrections for calculating the intensity correction for the pixel $P_{r,r}$, the direction 0° will only be incident for −200.

The above is also valid for intervals defined by the thresholds above the central threshold S(2), which are assigned, symmetrically to the previous case, the weighting factor W=1, when the intensity of the pixel being filtered $P_{r,r}$ is higher than that of the threshold S(3) and W=0.5, when said intensity is between the thresholds S(2) and S(3).

This expedient allows for a reduction of the correction values for the pixel being filtered, depending on the higher or lower closeness of the intensity value to the central threshold obtained as a grand mean of the intensity values of the pixels on the opposite sides of the pixel being filtered $P_{r,r}$ for each direction. This also reflects a certain statistical concept which reasonably accounts for the fact that, the closer the intensity of the pixel $P_{r,r}$ being filtered is to the central directional threshold value, the more the certainty that its intensity will be decreased or increased is reduced.

The introduction of thresholds involves an attenuation of the on-off effect and an outline-straightening effect, the so-called smoothing, without causing said outlines to be deformed or shifted as compared to the original situation and thus maintaining a high reproduction fidelity and a considerable image sharpness.

The algorithm which describes the high-pass filtering process according to the invention is very simple and does not need a very high computing power. This involves a remarkable filtering speed and the use of cheap computers.

Naturally, the invention is not limited to what has been described and illustrated herein, but may be greatly varied. So, the directions and the structure of matrices, as well as the areas of the image or of the pixel matrix to be considered for filtering the pixel $P_{r,r}$ may be chosen beneath the limits of the description and illustrations included herein. For example, a greater number of pixels for each direction may be considered. Moreover, the directions, though the use of vertical, horizontal, and diagonal directions is much simpler, may be also intended in a broader sense, that is as ideal paths joining a certain number of pixels at predetermined distances and in predetermined positions with respect to each other and to the pixel being filtered, and whose eventually weighted means are mutually statistically processed and used, as a mean to obtain comparison thresholds, and as a difference to define absolute correction values.

So, for example, the directions may also be polygonal lines ideally connecting any different pixel of the area under examination. The weighting functions of the intensity values of the pixels $P_{k,l}$ which are selected for filtering the pixel $P_{r,r}$ and may be varied according to their distance from the pixel being filtered, as well as the weighting factors of the directional corrections C(dir), the number of directional thresholds and the statistical attenuation weights related to the different intervals defined by said thresholds are also freely variable. The whole without departing from the guiding principle disclosed above and claimed below.

What is claimed is:

1. A high-pass filtering process for focusing images which are composed of a matrix of a plurality of pixels having respective luminous intensities, the filtering process comprises:

providing for each pixel of the image a respective correction of the intensity of said each pixel, which respective correction is calculated on the basis of high-pass filterings performed in at least one direction with respect to the matrix of the pixels forming the image, wherein the high-pass filter determines the respective correction of each pixel under examination, said respective correction being based on a mean of the respective intensities of at least one pair of the pixels being at predetermined distances from and on opposite sides of the pixel under examination, with reference to the at least one direction, creating a corresponding new filtered image, composed of the corrected pixels, wherein the respective correction of the intensity of each pixel is calculated on the basis of high-pass filterings performed in a plurality of directions; and the respective correction is based on a mean of the respective intensities of a plurality of pairs of the pixels.

2. Process as claimed in claim 1, wherein the correction is calculated as an appropriately weighted mean between correction values obtained from the means of the intensities of at least pairs of pixels, of the pixel matrix under examination, on opposite sides of the pixel being filtered, with reference to at least two different directions in the pixel matrix, preferably four directions of the pixel matrix, while said procedure is repeated for each pixel of the pixel matrix under examination, that is to be filtered.

3. Process as claimed in claim 2 wherein the correction of each pixel is calculated on the weighted combination of the so-called directional corrections, resulting from the means of at least two pairs of pixels on the opposite sides of the pixel being filtered ($P_{r,r}$; $P_{x,x}$), the pixel pairs being respectively oriented in predetermined directions with respect to the lines and columns of the pixel matrix, that is, in a horizontal direction, in a vertical direction, and in two intermediate diagonal directions, i.e. the pixels of at least each pair being selected according to a predetermined relative arrangement, in relation both to each other and to the pixel ($P_{x,x}$) being filtered.

4. Process as claimed in claim 3, wherein the directional correction values, whose normalized sum gives the intensity correction of the pixel being filtered may be weighted by choosing a directional weighting factor being equal to the modulus of the associated directional correction.

5. Process as claim 3, wherein, for each pixel being filtered, a surrounding pixel area is considered, the pixel being filtered occupying the center thereof, and a matrix of the intensity values of pixels, with a predetermined number of lines and a predetermined number of columns is generated, the correction values being obtained through filtering matrices for a plurality of directions, said matrices having the same dimensions as the matrices corresponding to the areas under examination; and having elements other than zero corresponding to the pixels whose intensity value is used to calculate the corresponding directional correction.

6. Process as claimed in claim 5, wherein four directions are considered, oriented 0°, 45°, 90°, 135°, with respect to the lines of the matrix under examination, which is centered around the pixel being filtered, the filtering matrices being of the following type:

$$\begin{pmatrix} g1 & g2 & g3 \\ 0 & 0 & 0 \\ g4 & g5 & g6 \end{pmatrix}$$

for the 0° direction, that is for the horizontal direction (O), $$\begin{pmatrix} f1 & 0 & f4 \\ f2 & 0 & f5 \\ f3 & 0 & f6 \end{pmatrix}$$

for the 90° direction, that is for the vertical direction (V), $$\begin{pmatrix} 0 & 0 & a3 & 0 & 0 \\ 0 & a2 & 0 & 0 & 0 \\ a1 & 0 & 0 & 0 & a6 \\ 0 & 0 & 0 & a5 & 0 \\ 0 & 0 & a4 & 0 & 0 \end{pmatrix}$$

for the 45° direction (D1), and $$\begin{pmatrix} 0 & 0 & b4 & 0 & 0 \\ 0 & 0 & 0 & b5 & 0 \\ b1 & 0 & 0 & 0 & b6 \\ 0 & b2 & 0 & 0 & 0 \\ 0 & 0 & b3 & 0 & 0 \end{pmatrix}$$

for the 135° direction (D2), in which the factors f1, g1, a1, b1, with i=1,2, ..., 6, are weighting factors for the intensity values of the pixels surrounding the pixel under examination, that is the central pixel to be filtered, said factors being functions of the distance of the corresponding pixel from the pixel being filtered.

7. Process as claimed in claim 6, wherein the directional thresholds are calculation as follows:

$$S(0°) = \left[ \frac{1}{2\left|\sum_{i=1,2,3} gi\right|} \text{modulus} \begin{pmatrix} g1 & g2 & g3 \\ 0 & 0 & 0 \\ 0 & 0 & 0 \end{pmatrix} + \right.$$

$$\left. \frac{1}{2\left|\sum_{i=4,5,6} gi\right|} \text{modulus} \begin{pmatrix} 0 & 0 & 0 \\ 0 & 0 & 0 \\ g4 & g5 & g6 \end{pmatrix} \right] \otimes$$

$$\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

in which the modulus function is defined as the matrix of the moduli, i.e. of the absolute values of the matrix elements, and in which $\otimes$ defines a particular product of these matrixes, which is defined as the sum of the products of the corresponding elements of the two matrices, i.e. those having the same positions, that is:

$$A \otimes B = \begin{pmatrix} a_{1,1} & a_{1,n} \\ a_{m,1} & a_{m,n} \end{pmatrix} \otimes \begin{pmatrix} b_{1,1} & b_{1,n} \\ b_{m,1} & b_{m,n} \end{pmatrix} = \sum_{i=1,m} \sum_{j=1,n} a_{ij} b_{ij}$$

and that the same is applicable for the other directions:

$$S(90°) =$$

$$\left[ \frac{1}{2\left|\sum_{i=1,2,3} fi\right|} \text{modulus} \begin{pmatrix} f1 & 0 & 0 \\ f2 & 0 & 0 \\ f3 & 0 & 0 \end{pmatrix} + \frac{1}{2\left|\sum_{i=4,5,6} fi\right|} \text{modulus} \begin{pmatrix} 0 & 0 & f4 \\ 0 & 0 & f5 \\ 0 & 0 & f6 \end{pmatrix} \right] \otimes$$

$$\begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$S(45°) = \left[ \frac{1}{2\left|\sum_{i=1,2,3} ai\right|} \text{modulus} \begin{pmatrix} 0 & 0 & a3 & 0 & 0 \\ 0 & a2 & 0 & 0 & 0 \\ a1 & 0 & 0 & 0 & 0 \\ 0 & 0 & 0 & 0 & 0 \\ 0 & 0 & 0 & 0 & 0 \end{pmatrix} + \right.$$

$$\left. \frac{1}{2\left|\sum_{i=4,5,6} ai\right|} \text{modulus} \begin{pmatrix} 0 & 0 & 0 & 0 & 0 \\ 0 & 0 & 0 & 0 & 0 \\ 0 & 0 & 0 & 0 & a6 \\ 0 & 0 & 0 & a5 & 0 \\ 0 & 0 & a4 & 0 & 0 \end{pmatrix} \right] \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$S(135°) = \left[ \frac{1}{2\left|\sum_{i=1,2,3} bi\right|} \text{modulus} \begin{pmatrix} 0 & 0 & 0 & 0 & 0 \\ 0 & 0 & 0 & 0 & 0 \\ b1 & 0 & 0 & 0 & 0 \\ 0 & b2 & 0 & 0 & 0 \\ 0 & 0 & b3 & 0 & 0 \end{pmatrix} + \right.$$

$$\left. \frac{1}{2\left|\sum_{i=4,5,6} bi\right|} \text{modulus} \begin{pmatrix} 0 & 0 & b4 & 0 & 0 \\ 0 & 0 & 0 & b5 & 0 \\ 0 & 0 & 0 & 0 & b6 \\ 0 & 0 & 0 & 0 & 0 \\ 0 & 0 & 0 & 0 & 0 \end{pmatrix} \right] \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

8. Process as claimed in claim 7, wherein, in the diagonal 45° and 135° directions, the filtering matrices may also have the same dimensions as those in the 0° and 90° directions, that is:

$$\begin{pmatrix} a2 & a3 & 0 \\ a1 & 0 & a6 \\ 0 & a4 & a5 \end{pmatrix} \begin{pmatrix} 0 & b4 & b5 \\ b1 & 0 & b6 \\ b2 & b3 & 0 \end{pmatrix}.$$

9. Process as claimed in claim 7, wherein, for each direction, several directional thresholds are determined as follows:

defining the intensity mean of the pixels on the opposite sides of the pixel being filtered, with reference to the direction like M(dir,1) and M(dir,2), with dir=0°, 45°, 90°, 135°

$$M(0°, 1) = \frac{1}{\sum_{i=1,2,3} gi} \begin{pmatrix} g1 & g2 & g3 \\ 0 & 0 & 0 \\ 0 & 0 & 0 \end{pmatrix} \otimes \begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$M(0°, 2) = \frac{1}{\sum_{i=4,5,6} gi} \begin{pmatrix} 0 & 0 & 0 \\ 0 & 0 & 0 \\ g4 & g5 & g6 \end{pmatrix} \otimes \begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

in which the symbol $\otimes$ indicates the product defined in claim 7 and the same being provided for the other directions:

$$M(90°, 1) = \frac{1}{\sum_{i=1,2,3} fi} \begin{pmatrix} f1 & 0 & 0 \\ f2 & 0 & 0 \\ f3 & 0 & 0 \end{pmatrix} \otimes \begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$M(90°, 2) = \frac{1}{\sum_{i=4,5,6} fi} \begin{pmatrix} 0 & 0 & f4 \\ 0 & 0 & f5 \\ 0 & 0 & f6 \end{pmatrix} \otimes \begin{pmatrix} I(P_{r-1,r-1}) & I(P_{r-1,r}) & I(P_{r-1,r+1}) \\ I(P_{r,r-1}) & I(P_{r,r}) & I(P_{r,r+1}) \\ I(P_{r+1,r-1}) & I(P_{r+1,r}) & I(P_{r+1,r+1}) \end{pmatrix}$$

$$M(45°, 1) = \frac{1}{\sum_{i=1,2,3} ai} \begin{pmatrix} 0 & 0 & a3 & 0 & 0 \\ 0 & a2 & 0 & 0 & 0 \\ a1 & 0 & 0 & 0 & 0 \\ 0 & 0 & 0 & 0 & 0 \\ 0 & 0 & 0 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$M(45°, 2) = \frac{1}{\sum_{i=4,5,6} ai} \begin{pmatrix} 0 & 0 & 0 & 0 & 0 \\ 0 & 0 & 0 & 0 & 0 \\ 0 & 0 & 0 & 0 & a6 \\ 0 & 0 & 0 & a5 & 0 \\ 0 & 0 & a4 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

$$M(135°, 1) = \frac{1}{\sum_{i=1,2,3} bi} \begin{pmatrix} 0 & 0 & 0 & 0 & 0 \\ 0 & 0 & 0 & 0 & 0 \\ b1 & 0 & 0 & 0 & 0 \\ 0 & b2 & 0 & 0 & 0 \\ 0 & 0 & b3 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

-continued $$M(135°, 2) = \frac{1}{\sum_{i=4,5,6} bi} \begin{pmatrix} 0 & 0 & b4 & 0 & 0 \\ 0 & 0 & 0 & b5 & 0 \\ 0 & 0 & 0 & 0 & b6 \\ 0 & 0 & 0 & 0 & 0 \\ 0 & 0 & 0 & 0 & 0 \end{pmatrix} \otimes$$

$$\begin{pmatrix} I(P_{r-2,r-2}) & I(P_{r-2,r-1}) & I(P_{r-2,r}) & I(P_{r-2,r+1}) & I(P_{r-2,r+2}) \\ I(P_{r-1,r-2}) & I(P_{r-1,r-1}) & I(P_{r-1,r}) & I(P_{r-1,r+1}) & I(P_{r-1,r+2}) \\ I(P_{r,r-2}) & I(P_{r,r-1}) & I(P_{r,r}) & I(P_{r,r+1}) & I(P_{2,r+2}) \\ I(P_{r+1,r-2}) & I(P_{r+1,r-1}) & I(P_{r+1,r}) & I(P_{r+1,r+1}) & I(P_{r+1,r+2}) \\ I(P_{r+2,r-2}) & I(P_{r+2,r-1}) & I(P_{r+2,r}) & I(P_{r+2,r+1}) & I(P_{r+2,r+2}) \end{pmatrix}$$

the individual threshold values by a number k, with k=1, . . . , n of threshold being:

$$S(dir,k)=[(n+1-k)\times M(dir,1)+k\times M(dir,2)]/(n+1).$$

10. Process as claimed in claim 9, wherein, given three thresholds, the weighting factors for the directional corrections are of 0.5 in the intervals between the central threshold and the two lower and higher thresholds, and of 1 in the intervals above the highest threshold and below the lowest threshold.

11. Process as claimed in claim 5, wherein f1=f3=−f4=−f6 and f2=−f5; and accordingly g1=g3=−g4=−g6 and g2=−g5; a1=a3=−a4=−a6 and a2=−a5; and b1=b3=−b4=−b6 and b2=−b5.

12. Process as claimed in claim 11, wherein f1=g1=a1=b1 and f2=g2=a2=b2.

13. Process as claimed in claim 12, wherein f1=f3=−f4=−f6=g1=g3=−g4=−g6=a1=a3=−a4=−a6=b1=b3=−b4=−b6=1 and f2=−f5=g2=−g5=a2=−a5=b2=−b5=2.

14. Process as claimed in claim 1, wherein, while calculating the means of the intensities of at least pairs of pixels on the opposite sides of the pixel being filtered, the pixel intensity is weighted according to their distance from the pixel being filtered, each intensity value being multiplied by a distance dependent factor decreasing as the distance increases.

15. Process as claimed in claim 1, the process including the following steps:

a) Calculating, for each of four different directions, which may be defined with reference to the pixel matrix, the means of the intensity values, appropriately weighted with respect to distance, of two or more pixels of the pixel matrix, that is of the image to be filtered, said pixels being on opposite sides of the pixel under examination, and aligned along a predetermined direction;

b) Calculating, for each of the four directions, which may be defined with reference to the pixel matrix under examination, a so-called directional intensity threshold, which equals the grand mean of the intensities of the pixels on the opposite sides of the pixel being filtered;

c) Calculating, for each of the four directions, which may be defined with reference to the pixel matrix, a so-called directional, i.e. direction-dependent correction factor, which is the absolute value of the difference between the means of the intensities of the neighboring pixels on the two opposite sides of the pixel under examination, and aligned in the predetermined direction, the said mean being appropriately weighted by multiplying it by a weighting factor, and the absolute value of said value multiplied by the corresponding correction factor being assigned a positive or negative sign, according to whether the intensity of the pixel being filtered is higher or lower than the threshold value for the corresponding direction;

d) Calculating the intensity correction of the pixel being filtered, by adding up the individual appropriately weighted directional corrections, as in the previous step c) and by normalizing said sum by dividing it by the sum of the weighting multiplying factors of the directional correction values;

e) Adding the correction value obtained therefrom to the intensity value of the pixel being filtered;

f) Creating a digital image, in the form of a pixel matrix, in which, in the corresponding position of the pixel being filtered, the intensity corrected by filtering the pixel is displayed;

g) Repeating the previous steps a) to e) for each of at least one predetermined part or of all the pixels of the pixel matrix in the pre-filtering situation.

16. Process as claimed in claim 15, wherein for each direction of at least one of the directions, which may be defined with reference to the pixel matrix, any greater number n of directional thresholds are defined, with the help of the means of the intensities of the neighboring pixels on the opposite sides of the pixel being filtered, thus generating a number of intervals, in which the intensity of the pixel being filtered may fall, and providing that an attenuation and/or enhancement factor be assigned to the directional correction of intensity for the corresponding direction, which varies according to the interval in which the intensity of the pixel being filtered falls, that is an attenuation and/or enhancement factor, assigned to the directional correction of intensity, which is a function of the interval between the directional thresholds in which the intensity of the pixel being filtered falls.

17. Process as claimed in claim 16, wherein the directional correction attenuating/enhancing factor is such, that the factor increases as the absolute value of the difference between the intensity of the pixel being filtered and the central threshold increases.

18. Process as claimed in claim 17, wherein the maximum weighting factor is 1.

19. Process as claimed in claim 8, wherein the function defining the dependence of the weighting factor on the intervals defined by the directional thresholds, is a discrete function having fixed decreases of $2/(n+1)$ for each interval defined by n thresholds, starting from the value of 1, corresponding to the interval outside the highest or lowest threshold, with respect to the central threshold, said weighting factors being symmetrical with respect to the central threshold, in case of an odd number of thresholds.

20. Process as claimed in claim 1, wherein the correction of the pixel being filtered is obtained through the following formula:

$$C(P_{r,r}) = \frac{\sum_{dir=0°,45°,90°,135°} C(dir) \times Q(dir) \times \text{sign}[I(P_{r,r}) - S(dir)]}{\sum_{dir=0°,45°,90°,135°} Q(dir)}$$

in which sign(x) is the function which takes the value (−1) when x<0 and (+1) when x>0.

21. Process as claimed in claim 1, wherein the intensity correction value of the pixel being filtered, resulting from the normalized sum of the directional corrections associated to said pixel, is weighted once again by an attenuation/enhancement factor, before being added to the original intensity of the pixel being filtered, this attenuation/enhancement factor for the intensity correction of the pixel being filtered, being empirically defined by evaluating the visual effect on the displayed image.

22. Process as claimed in claim 21, wherein the attenuation/enhancement factor for the intensity correction of the pixel being filtered, may be different for different pixels or groups thereof, or the same throughout the pixel matrix.

23. A high-pass filtering process for focusing images which are composed of a matrix of a plurality of pixels having respective luminous intensities, the filtering process comprises:

providing for each pixel of the image a respective correction of the intensity of said each pixel, which respective correction is calculated on the basis of high-pass filterings performed in a plurality of directions with respect to the matrix of the pixels forming the image, wherein the high-pass filter determines the respective correction of each pixel under examination, said respective correction being determined by:

calculating a weighted average intensity of a plurality of pairs of pixels on opposite sides of the pixel under examination and along one of the plurality of directions wherein the intensities of the pixels that are closer to the pixel under examination are given a greater weight than pixels further away from the pixel under examination, repeating the weighted average calculating step for each of the plurality of directions, and said respective correction being the average of the calculated weighted average intensities.

24. The process of claim 23, wherein the intensity of each of the plurality of pairs is weighted based on the respective predetermined distance.

25. The process of claim 24, wherein the weighting is inversely proportional to the predetermined distance.

26. A high-pass filtering process for focusing images that are comprised of a matrix of a plurality of pixels, each of the pixels having a respective intensity, the process comprising the steps of:

(a) determining the respective intensities of a pair of pixels that are at a predetermined distance from, and on opposite sides of, a particular one of the pixels of the matrix, with reference to a predetermined direction;

(b) weighting the respective intensities of the pair of pixels based on the predetermined distance;

(c) calculating a mean of the respective intensities of the pair of pixels;

(d) calculating a correction for the particular pixel based on the calculated mean;

(e) correcting the respective intensity of the particular pixel using the calculated correction; and (f) repeating steps (a) through (d) for each of the plurality of pixels.

27. The process of claim 26, wherein:

the determining step (a) includes determining the respective intensities of a plurality of pairs of the pixels that are at predetermined distances from, and on opposite sides of, the particular one pixel, with reference to the predetermined direction; and wherein the mean calculated in step (c) is a mean of the respective intensities of the plurality of pairs of the pixels; and wherein the weighting step (b) includes weighting the respective intensities of the plurality of pairs of the pixels based on their respective predetermined distances.

28. The process of claim 26, wherein:

the determining step (a) includes determining the respective intensities of a plurality of pairs of the pixels that are at predetermined distances from, and on opposite sides of, the particular one pixel, with reference to a plurality of directions; and wherein the mean calculated in step (b) is a mean of the respective intensities of the plurality of pairs of the pixels.

29. The process of claim 28, wherein a preliminary correction is calculated for each of the plurality of directions based on the means of the respective intensities of the pairs of pixels with reference to the respective direction.

30. A high-pass filtering process for focusing images that are comprised of a matrix of a plurality of pixels, each of the pixels having a respective intensity, the process comprising the steps of:

(a) determining the respective intensities of a pair of pixels that are at a predetermined distance from, and on opposite sides of, a particular one of the pixels of the matrix, with reference to a predetermined direction;

(b) calculating a mean of the respective intensities of the pair of pixels;

(c) calculating a correction for the particular pixel based on the calculated mean;

(d) correcting the respective intensity of the particular pixel using the calculated correction; and (e) repeating steps (a) through (d) for each of the plurality of pixels, wherein
the determining step (a) includes determining the respective intensities of a plurality of pairs of the pixels that are at predetermined distances from, and on opposite sides of, the particular one pixel, with reference to the predetermined direction; and wherein the mean calculated in step (b) is a mean of the respective intensities of the plurality of pairs of the pixels.

31. The process of claim 30, wherein the intensity of each of the plurality of pairs is weighted based on the respective predetermined distance.

32. The process of claim 31, wherein the weighting is inversely proportional to the predetermined distance.

33. A high-pass filtering process for focusing images that are comprised of a matrix of a plurality of pixels, each of the pixels having a respective intensity, the process comprising the steps of:

(a) determining the respective intensities of a pair of pixels that are at a predetermined distance from, and on opposite sides of, a particular one of the pixels of the matrix, with reference to a predetermined direction;

(b) calculating a mean of the respective intensities of the pair of pixels;

(c) calculating a correction for the particular pixel based on the calculated mean;

(d) correcting the respective intensity of the particular pixel using the calculated correction; and (e) repeating steps (a) through (d) for each of the plurality of pixels, wherein:
the determining step (a) includes determining the respective intensities of a plurality of pairs of the pixels that are at predetermined distances from, and on opposite sides of, the particular one pixel, with reference to a plurality of directions; and wherein the mean calculated in step (b) is a mean of the respective intensities of the plurality of pairs of the pixels.

* * * * *